US006354498B1

(12) United States Patent
Lutz

(10) Patent No.: US 6,354,498 B1
(45) Date of Patent: Mar. 12, 2002

(54) METHOD FOR DISPLAYING THE STATUS OF A SELF-SERVICE CHECKOUT TERMINAL

(75) Inventor: Dusty L. Lutz, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 08/998,210

(22) Filed: Dec. 24, 1997

(51) Int. Cl.[7] ............................ G06F 17/60; A63F 9/02

(52) U.S. Cl. ......................... 235/385; 235/383; 186/59; 186/52

(58) Field of Search ..................... 186/59, 52; 235/383, 235/385, 375

(56) References Cited

U.S. PATENT DOCUMENTS

| | | | | |
|---|---|---|---|---|
| 3,182,357 A | | 5/1965 | Tuttle ........................... | 20/1.7 |
| 4,676,343 A | | 6/1987 | Humble et al. ............... | 186/61 |
| 4,679,154 A | * | 7/1987 | Blanford ...................... | 364/525 |
| 4,964,053 A | | 10/1990 | Humble ....................... | 364/466 |
| 5,083,638 A | | 1/1992 | Schneider .................... | 186/61 |
| 5,343,025 A | * | 8/1994 | Usui .......................... | 235/383 |
| 5,378,860 A | | 1/1995 | Dingfelder et al. ...... | 177/25.19 |
| 5,397,882 A | * | 3/1995 | Van Solt ..................... | 235/381 |
| 5,525,786 A | * | 6/1996 | Sumont ...................... | 235/462 |
| 5,979,757 A | * | 11/1999 | Tracy et al. ................ | 235/383 |

* cited by examiner

*Primary Examiner*—Karl D. Frech
*Assistant Examiner*—Jamara A Franklin
(74) *Attorney, Agent, or Firm*—Maginot, Addison & Moore LLP

(57) ABSTRACT

A method of operating a self-service checkout terminal includes the step of detecting an improper-terminal-use activity and generating an improper-use control signal in response thereto. The method also includes the step of operating a status device in a first mode of operation in response to generation of the improper-use control signal. The method further includes the step of updating an electronic log value in response to generation of the improper-use control signal. Moreover, the method includes the step of generating a first intervention signal if the log value has a predetermined relationship to a log threshold. The method also includes the step of operating the status device in a second mode of operation in response to generation of the first intervention control signal, wherein the first mode of operation is different from the second mode of operation. The method yet further includes the step of generating an end-of-itemization control signal in response to a user's indication that the user has no further items to enter into the checkout terminal. The method also includes the step of operating the status device in a third mode of operation if (1) the end-of-itemization signal has been generated, and (2) the status device was operating in the second mode of operation when the end-of-itemization control signal is generated, wherein the third mode of operation is different from each of the first mode of operation and the second mode of operation.

14 Claims, 10 Drawing Sheets

METHOD FOR DISPLAYING THE STATUS OF A SELF-SERVICE CHECKOUT TERMINAL

TECHNICAL FIELD OF THE INVENTION

The present invention relates generally to a checkout or point-of-sale (POS) terminal, and more particularly to a method for displaying the status of a self-service checkout terminal.

BACKGROUND OF THE INVENTION

In the retail industry, the largest expenditures are typically the cost of the goods sold followed closely by the cost of labor expended. With particular regard to the retail grocery or supermarket industry, the impetus to reduce labor costs has focused on reducing or eliminating the amount of time required to handle and/or process the items or goods to be purchased by a customer. To this end, there have been a number of self-service checkout terminal concepts developed which attempt to substantially eliminate the need for a checkout clerk.

A self-service checkout terminal is a system which is operated by a customer without the aid of a checkout clerk. In such a system, the customer scans individual items for purchase across a scanner and then places the scanned item into a grocery bag, if desired. The customer then pays for his or her purchase either at the self-service checkout terminal if so equipped, or at a central payment area which is staffed by a store employee. Thus, a self-service checkout terminal permits a customer to select, itemize, and in some cases pay for his or her purchase without the assistance of the retailer's personnel.

However, during some transactions it may become necessary to have a customer service manager or the like intervene in the transaction. In particular, a customer typically has little or no training in the operation of the self-service checkout terminal prior to his or her initial use of the checkout terminal. Hence, during some transactions the customer may request intervention by a customer service manager in order to facilitate use of the self-service checkout terminal.

It is also known that some customers may have improper intentions when using a self-service checkout terminal. In traditional checkout systems, the clerk employed by the retailer to operate the checkout terminal provides a level of security against theft or other improprieties. However, in the case of the self-service checkout terminal, the terminal itself must provide a level of security against theft or other improprieties, and must also be able to request intervention by the customer service manager if the terminal determines that a transaction may be improper.

Other transactions may always require intervention by the customer service manager. In particular, certain transactions may include the purchase of restricted items which by law or otherwise require intervention by the customer service manager. For example, the customer service manager may be required to check the identification (i.e. verify the age) of a customer purchasing alcoholic beverages.

During operation of the self-service checkout terminal, it is necessary to communicate the status of the terminal to the customer service manager. In particular, the customer service manager should know (1) when the self-service checkout terminal is in use, (2) when intervention is needed in the near future (e.g. the customer scanned an alcoholic beverage which will require an ID check by the customer service manager), and (3) when intervention is needed immediately (e.g. the customer is ready to tender payment but the customer service manager has not yet made the ID check required for the purchase of the alcoholic beverage).

Furthermore, if the status of the self-service checkout terminal is communicated in a manner which is also easily understood by the customer, proper use of the self-service checkout terminal may be reinforced and improper use of the terminal may be deterred. In particular, if the customer realizes that the status of the self-service checkout terminal is being communicated to the customer service manager, the customer is less likely to operate the self-service checkout terminal with the intention to commit an impropriety such as theft.

What is needed therefore is a self-service checkout terminal which displays status information associated with operation of the self-service checkout terminal. What is further needed is a self-checkout terminal which displays status information in a format which is easily understood by both the customer service manager and the customer.

SUMMARY OF THE INVENTION

In accordance with a first embodiment of the present invention, there is provided a method of operating a self-service checkout terminal. The method includes the step of detecting an improper-terminal-use activity and generating an improper-use control signal in response thereto. The method also includes the step of operating a status device in a first mode of operation in response to generation of the improper-use control signal. The method further includes the step of updating an electronic log value in response to generation of the improper-use control signal.

In accordance with a second embodiment of the present invention, there is provided a method of operating a self-service checkout terminal. The method includes the step of detecting an improper-terminal-use activity and generating an improper-use control signal in response thereto. The method also includes the step of operating a status device in a first mode of operation in response to generation of the improper-use control signal. The method further includes the step of updating an electronic log value in response to generation of the improper-use control signal. Moreover, the method includes the step of generating a first intervention signal if the log value has a predetermined relationship to a log threshold. The method also includes the step of operating the status device in a second mode of operation in response to generation of the first intervention control signal, wherein the first mode of operation is different from the second mode of operation. The method yet further includes the step of generating an end-of-itemization control signal in response to a user's indication that the user has no further items to enter into the checkout terminal. The method also includes the step of operating the status device in a third mode of operation if (1) the end-of-itemization signal has been generated, and (2) the status device was operating in the second mode of operation when the end-of-itemization control signal is generated, wherein the third mode of operation is different from each of the first mode of operation and the second mode of operation.

In accordance with a third embodiment of the present invention, there is provided a method of operating a self-service checkout terminal. The method includes the step of detecting if a user enters a restricted item into the checkout terminal and generating a restricted-item control signal in response thereto. The method also includes the step of operating a status device in a first mode of operation in response to generation of the restricted-item control signal.

It is therefore an object of the present invention to provide a new and useful checkout terminal.

It is a further object of the present invention to provide an improved checkout terminal.

It is yet another object of the present invention to provide a new and useful method of operating a checkout terminal.

It is moreover an object of the present invention to provide an improved method of operating a checkout terminal.

The above and other objects, features, and advantages of the represent invention will become apparent from the following description and the attached drawings.

DETAILED DESCRIPTION OF THE INVENTION

Figure 1:
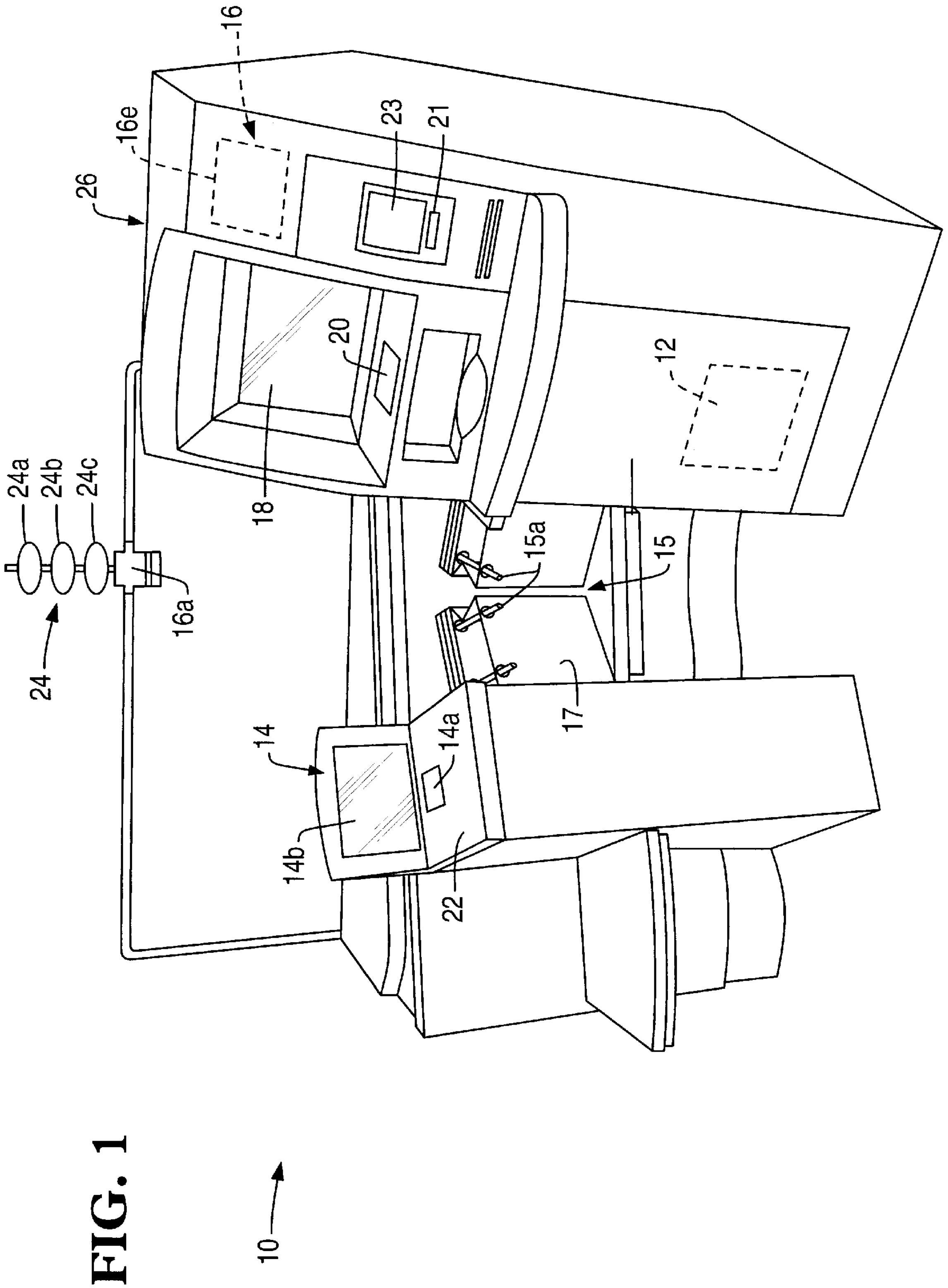
FIG. 1 is a perspective view of a self-service checkout terminal which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
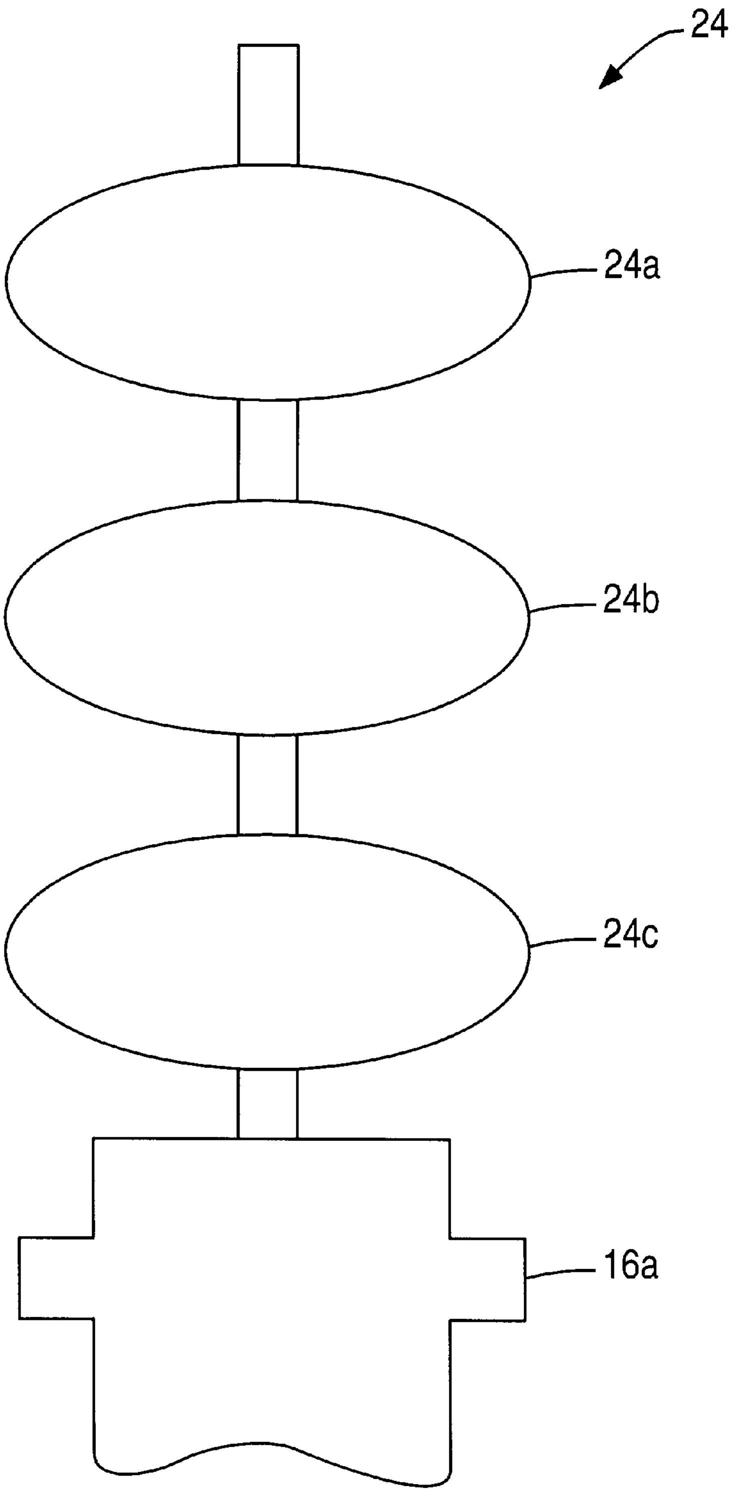
FIG. 2 is an enlarged elevational view of the status light device of the self-service checkout terminal of FIG. 1.

Referring now to FIGS. 1 and 2, there is shown a self-service checkout terminal 10 for use in a retail business such as a grocery store. The self-service checkout terminal 10 includes a processing unit 12, a scanner 14, a video system 16, a display monitor 18, a data input device 20, a card reader 21, a currency acceptor 23, a product scale 22, and a status device such as a status light device 24. The self-service checkout terminal 10 also includes a bagwell 15 for accommodating one or more grocery bags 17, and a counter 19. The display monitor 18, the data input device 20, the card reader 21, the currency acceptor 23, and a number of the components associated with the video system 16 may be embodied as separate devices, or they may be preferably embodied as integrated components associated with an automated teller machine (ATM) 26. For example, a video camera 16*a* of the video system 16 may be embodied as a separate component (see FIG. 1), or may be alternatively embodied as a component integrated into the ATM 26 (see FIG. 3).

The scanner 14 conventionally scans or reads a product identification code such as a Universal Product Code (UPC), industrial symbol(s), alphanumeric character(s), or other indicia associated with an item to be purchased. One scanner which may be used in the present invention is a model number 7875 bi-optic scanner which is commercially available from NCR Corporation of Dayton, Ohio.

The scanner 14 includes a first scanning window 14*a* and a second scanning window 14*b*. The first scanning window 14*a* is disposed in a substantially horizontal manner, whereas the second scanning window 14*b* is disposed in a substantially vertical manner, as shown in FIG. 1. The product scale 22 is integrated with the scanner 14. More specifically, the product scale 22 is disposed substantially parallel to the scanning window 14*a* thereby enveloping the scanning window 14*a*. If an item such as produce is placed upon the product scale 22 or the first scanning window 14*a*, the product scale 22 may be used to determine the weight of the item.

The scanner 14 also includes a light source (not shown) such as a laser, a rotating mirror (not shown) driven by a motor (not shown), and a mirror array (not shown). In operation, a laser beam reflects off the rotating mirror and mirror array to produce a pattern of scanning light beams. As the product identification code on an item is passed over the scanner 14, the scanning light beams scatter off the code and are returned to the scanner 14 where they are collected and detected. The reflected light is then analyzed electronically in order to determine whether the reflected light contains a valid product identification code pattern. If a valid code pattern is present, the product identification code is then converted into pricing information which may then be used to determine the cost of the item in a known manner.

The video camera 16*a* of the video system 16 is disposed above the counter 19 and is positioned for detecting motion within a number of "target areas" associated with the video system 16. What is meant herein by use of the term "target area" of the video system 16 is an area across which the video system 16 is capable of detecting motion. For example, a first target area is defined by the maximum range in which an item can be successfully scanned as it is passed across the scanner 14. A second target area is defined by an area proximate the bagwell 15. It should be appreciated that motion proximate the bagwell 15 is indicative of an item being placed into or removed from one of the grocery bags 17. A third target area is defined by an area proximate the ATM 26. Motion proximate the ATM 26 is indicative of a customer attempting to use a component of the ATM 26 such as the data input device 20.

The status light device 24 is mounted above the video camera 16*a* as shown in FIG. 2. Such a mounting configuration places the status light device 24 in a position in which the status light device 24 may be readily viewed by a customer service manager from any one of a large number of locations throughout the store. Moreover, such a mounting configuration also places the status light device 24 proximate the video camera 16*a* thereby attracting the customer's attention to the video camera 16*a* whenever the status light device 24 is active. Hence, such a mounting configuration, provides a psychological deterrent to any illicit activity that a customer might be contemplating.

The status light device 24 includes a number of indicator lamps 24*a*, 24*b*, and 24*c*. Each of the indicator lamps 24*a*, 24*b*, 24*c* has a different reference color associated therewith. In particular, when actuated the red indicator lamp 24*a* displays a red light, the yellow indicator lamp 24*b* displays a yellow light, and the green indicator lamp 24*c* displays a green light. Such an arrangement corresponds to the well known configuration of a traffic light thereby allowing a customer with little or no training in the operation of the self-service checkout terminal 10 to have a general understanding of the information displayed by the status light device 24.

The display monitor 18 displays instructions which serve to guide a customer through a checkout procedure. For example, an instruction is displayed on the display monitor 18 which instructs the customer to remove an item from a grocery cart or trolley (not shown) and pass the item over the scanner 14. If the scanner 14 successfully scans or reads the product identification code associated with the item, then a visual indication is generated on the display monitor 18. If for any reason the scanner 14 cannot read or otherwise determine the product identification code associated with the item, a visual error message is generated on the display monitor 18. Moreover, the display monitor 18 may be a known touch screen monitor which can generate data signals when certain areas of the screen are touched by a customer.

The bagwell 15 is disposed between the scanner 14 and the ATM 26 as shown in FIG. 1. The bagwell 15 includes a number of posts 15*a* which cooperate to support a number of the grocery bags 17. The bagwell 15 is configured to allow two or more grocery bags 17 to be accessed by the customer at any given time. In particular, the posts 15*a* are of a sufficient length to secure a number of unopened grocery bags 17 along with two or more opened grocery bags 17 thereby allowing a customer to selectively load various item types into the grocery bags 17. For example, the customer may desire to use a first grocery bag 17 for household chemical items such as soap or bleach, and a second grocery bag 17 for edible items such as meat and produce.

Figure 3:
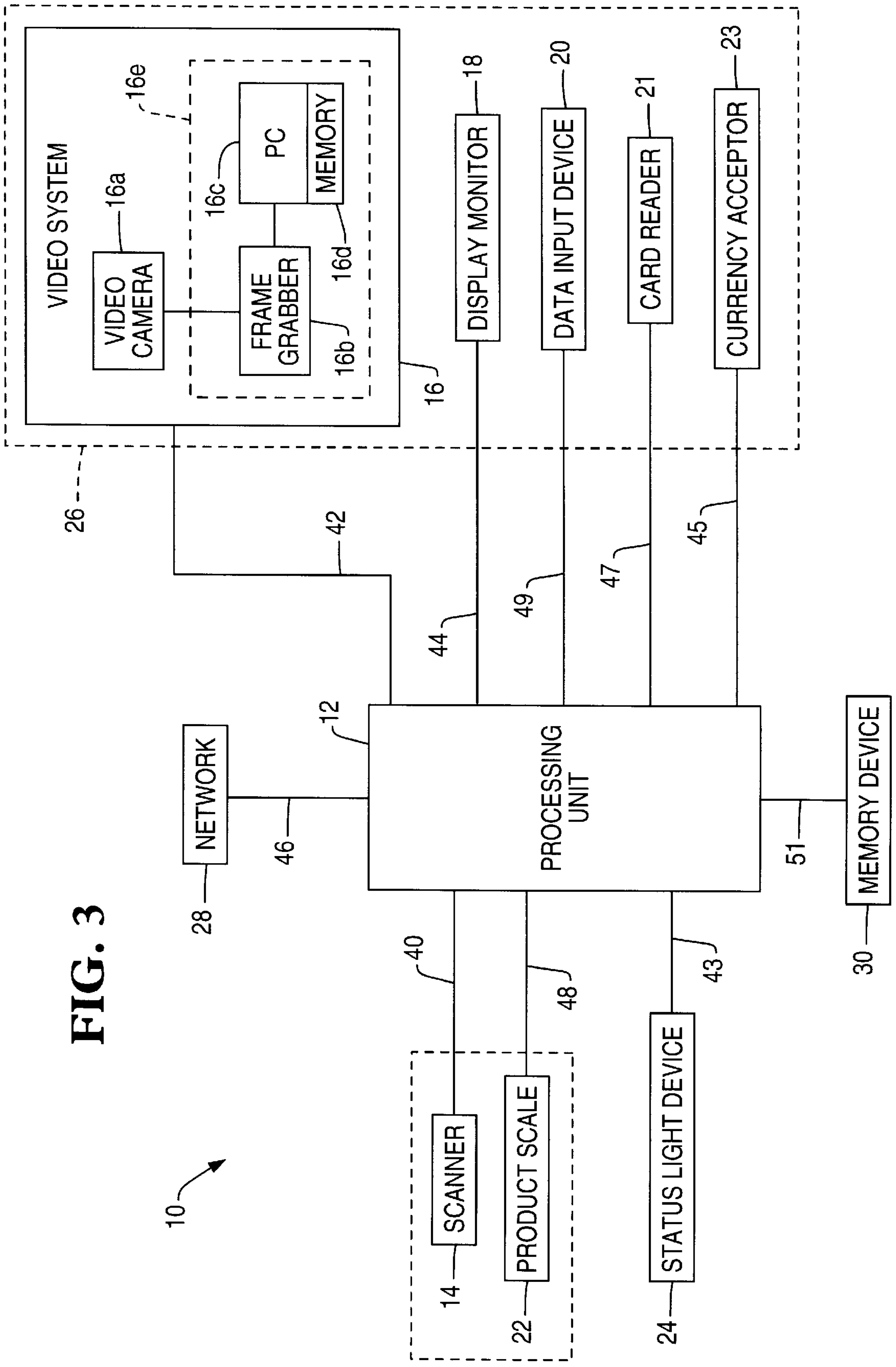
FIG. 3 is a simplified block diagram of the self-service checkout terminal of FIG. 1.

Referring now to FIG. 3, there is shown a simplified block diagram of the self-service checkout terminal 10. The processing unit 12 is electrically coupled to the scanner 14, the video system 16, the display monitor 18, the data input device 20, the card reader 21, the product scale 22, the currency acceptor 23, and the status light device 24. Moreover, the processing unit 12 is electrically coupled to a network 28 and a memory device 30, as shown in FIG. 3.

The processing unit 12 monitors output signals generated by the scanner 14 via a data communication line 40. In particular, the scanner 14 generates an output signal on the data communication line 40 when a bar code associated with an item is successfully scanned or otherwise read by the scanner 14.

The processing unit 12 communicates with the video system 16 through a data communication line 42. The video system 16 includes the video camera 16*a*, a frame grabber 16*b*, and a processing system 16*c* such as a personal computer (PC). The PC 16*c* and the frame grabber 16*b* are collectively referred to as a video processor 16*e*. The video processor 16*e* receives a standard video signal format, such as RS-170, NTSC, CCIR, or PAL, from the video camera 16*a*.

Video output signals from the video camera 16*a* are input to the frame grabber 16*b*. The frame grabber 16*b* operates to convert the analog video signals from the video camera 16*a* into a digital image which is stored within a memory 16*d* for subsequent processing by the video processor 16*e*. Once representations of the stream of digital images from the video camera 16*a* are sequentially stored in memory 16*d*, the video processor may begin to analyze or otherwise process the video image. For example, a video system which is suitable for use in the present invention is disclosed in U.S. Provisional Patent Application Ser. No. 60/045,001 entitled "Motion Pattern Recognition for a Self Checkout System" by Ralph Crabtree, which was filed on Feb. 7, 1997, the disclosure of which is hereby incorporated by reference, and is assigned to the same assignee as the present invention.

The processing unit 12 communicates with the status light device 24 via a data communication line 43. The processing unit 12 generates output signals on the data communication line 43 which cause the indicator lamps 24*a*, 24*b*, and 24*c* to be switched between various modes of operation. In particular, the processing unit 12 may cause each of the indicator lamps 24*a*, 24*b*, and 24*c* to selectively (1) deactuate thereby displaying no light, (2) actuate thereby displaying a continuous or solid light, or (3) flash thereby displaying an intermittent or flashing light.

The processing unit 12 communicates with the display monitor 18 through a data communication line 44. The processing unit 12 generates output signals on the data communication line 44 which cause various instructional messages to be displayed on the display monitor 18. The display monitor 18 may include known touch screen technology which can generate output signals when the customer touches a particular area of the display screen associated with the display monitor 18. The signals generated by the display screen are transmitted to the processing unit 12 via the data communication line 44. It should be appreciated that throughout the duration of a given checkout procedure, the display monitor 18 may display a message which instructs the customer to either touch a particular key associated with the data input device 20 or touch a particular area of the display monitor 18 in order to request assistance or help from store personnel.

The processing unit 12 is coupled to the product scale 22 via a data communication line 48. The product scale 22 generates output signals on the data communication line 48 which are indicative of the weight of an item positioned on the product scale 22.

The data input device 20 is coupled to the processing unit 12 through a data communication line 49. The data input device 20 may include one or more of a known keypad or a touch pad.

The card reader 21 is coupled to the processing unit 12 through a data communication line 47. The card reader 21 may include a known credit and/or debit card reader or a smart card reader.

The currency acceptor 23 is coupled to the processing unit 12 through a data communication line 45. The currency acceptor 23 may include both a paper currency acceptor and a coin acceptor thereby enabling the customer to tender payment for his or her purchases with cash.

The processing unit 12 includes network interface circuitry (not shown) which conventionally permits the self-service checkout terminal 10 to communicate with the network 28 such as a LAN or WAN through a wired connection 46. The processing unit 12 communicates with the network 28 during the checkout procedure in order to communicate with a paging system (not shown) or the like which pages or otherwise alerts the retailer's personnel as described further below. In addition, the processing unit 12 communicates with the network 28 to obtain information such as pricing information of an item being scanned, and also to verify customer credit approval when appropriate. The network interface circuitry associated with the self-service checkout terminal 10 may include a known Ethernet expansion card, and the wired connection 46 may include a known twisted-pair communication line. Alternatively, the network interface circuitry may support wireless communications with the network 28.

The processing unit 12 communicates with the memory device 30 via a data communication line 51. The memory device 30 is provided to maintain an electronic transaction table which includes a record of the product information associated with each item that is scanned, weighed, or otherwise entered during the customer's use of the self-service checkout terminal 10. For example, if the customer scans a can of soup, the description of the soup and the pricing information associated therewith is recorded in the transaction table in the memory device 30. Similarly, if the customer weighs a watermelon with the product scale 22 and then enters a product lookup code associated with watermelon via the data input device 20, product information associated with the watermelon is recorded in the transaction table. Moreover, if a customer enters a coupon or voucher, the information associated therewith would also be recorded in the transaction table.

It should therefore be appreciated that the sum of each of the items recorded in the transaction table (1) minus any reductions (e.g. coupons), and (2) plus any applicable taxes is the amount that the customer pays for his or her transaction. Moreover, selected portions of the data stored in the transaction table is printed out on a printer (not shown) thereby generating a receipt for the customer at the end of his or her transaction.

The memory device 30 is also provided to maintain a number of electronic logs associated with operation of the self-service checkout terminal 10. More specifically, the memory device 30 electronically maintains an event log and a suspicion log.

The event log is provided to track or otherwise tally the number of occasions in which a given customer operates the self-service checkout terminal 10 improperly. In particular, the event log tracks those occasions in which the customer unintentionally operated the self-service checkout terminal 10 improperly, along with those occasions in which it can be inferred with a high degree of confidence that the customer intentionally operated the self-service checkout terminal 10 improperly for illicit purposes such as theft. For example, if the video system 16 detects that the customer passed an item across the scanning windows 14*a*, 14*b* of the scanner 14, but the product identification code was not read by the scanner 14, an entry is made in the event log. This is true since the product identification code may not have been read due to an unintentional improper orientation of the item being scanned. However, the possibility does exist that the customer may have intentionally prevented the product identification code from being read (e.g. by placing his or her thumb over the code while passing the item over the scanner 14). Therefore, an entry is made in the event log.

The suspicion log on the other hand, is provided to track or otherwise tally the number of occasions in which a given customer operates the self-service checkout terminal 10 improperly, and it can be inferred with a high degree of confidence that the customer was intentionally operating the self-service checkout terminal 10 improperly for illicit reasons such as theft. For example, if the video system 16 detects motion associated with the customer attempting to place an item in the grocery bag 17, but did not detect motion associated with the customer attempting to move the item across the scanning windows 14*a*, 14*b* of the scanner 14, it can be inferred with a high degree of confidence that the customer was intentionally operating the self-service checkout terminal 10 improperly. This is true since the customer apparently made no attempt to scan the item prior to placing the item in the bag 17. Therefore, an entry is made in the suspicion log.

It should be appreciated that a predetermined threshold value may be established for both the event log and the suspicion log. More specifically, a retailer may establish a threshold value for each of the logs that once exceeded causes the processing unit 12 to communicate with the status light device 24 in order to actuate one of the indicator lamps 24*a*, 24*b*, or 24*c* thereby alerting the customer service manager. For example, the indicator lamp 24*b* of the status light device 24 may be actuated so as to display a solid yellow light if the event log exceeds a value of three. Moreover, the indicator lamp 24*a* of the status light device 24 may be actuated so as to display a solid red light thereby indicating that it is necessary to audit or otherwise investigate the customer's transaction if the suspicion log exceeds a value of 1½. Alternatively, or in addition to actuation of the status light device 24, the processing unit 12 may communicate with the network 28 in order to page or otherwise alert the retailer's personnel if either the event or suspicion log exceeds their respective threshold values.

Figure 4:
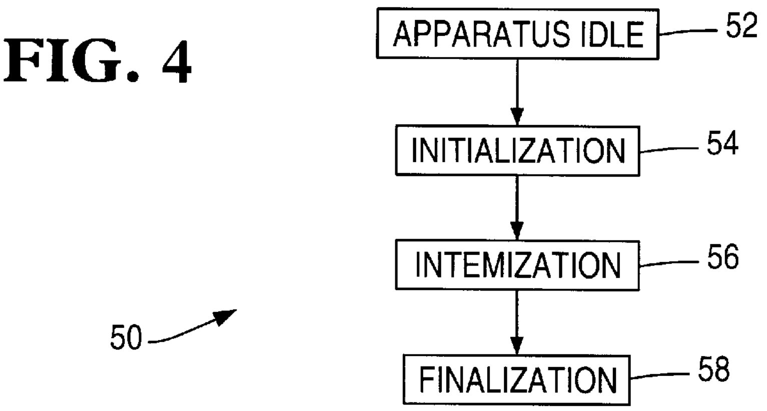
FIG. 4 is a flowchart setting forth the general procedure for checking out items through the self-service checkout terminal of FIG. 1.

Referring now to FIG. 4, there is shown a flowchart which sets forth a general procedure 50 for checking out items through the self-service checkout terminal 10. When a customer arrives at the self-service checkout terminal 10, the self-service checkout terminal 10 is in an idle state (step 52). An initialization step 54 is executed prior to checking out items for purchase. In particular, one or more initialization instructions are displayed on the display monitor 18 which provide general operating instructions to the customer, along with specific instructions as to how the customer may begin the checkout procedure.

At the completion of the initialization step 54, the routine 50 advances to an itemization step 56 where the customer enters the individual items for purchase into the self-service checkout terminal 10 via use of the scanner 14, the product scale 22, the data input device 20, and/or the touch screen associated with the display monitor 18. At the completion of the itemization step 56, the routine 50 advances to a finalization step 58 in which (1) a grocery receipt is printed, and (2) payment is tendered by either inserting currency into a currency acceptor 23, charging a credit card or debit card account, or decreasing a value amount stored on a smart card via the card reader 21. It should be appreciated that in the case of when a customer inserts currency into the currency acceptor 23, the self-service checkout terminal 10 may provide change via a paper currency dispenser (not shown) and a coin dispenser (not shown). After completion of the finalization step 58, the routine 50 returns to step 52 in which the self-service checkout terminal 10 remains in an idle condition until a subsequent customer initiates a checkout procedure.

Figure 5:
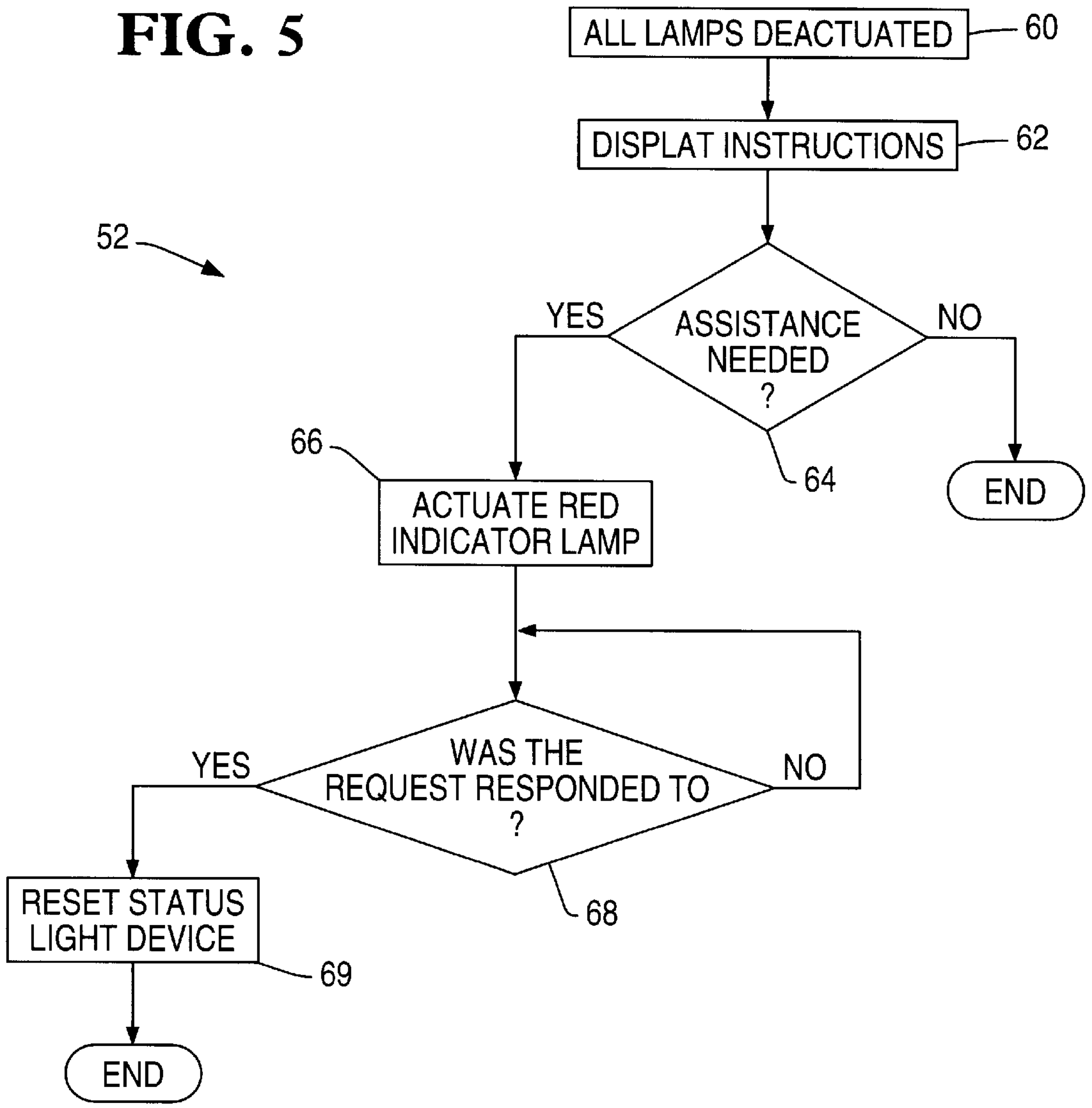
FIG. 5 is a flowchart setting forth in detail the idle step of the general procedure of FIG. 4.

Referring now to FIG. 5, there is shown a flowchart setting forth the idle step 52 of the routine 50 in greater detail. The routine 52 begins with step 60 in which the status light device 24 is placed in an idle mode of operation. In particular, in step 60, the processing unit 12 generates an output signal which causes the status light device 24 to deactuate each of the signal lamps 24*a*, 24*b*, or 24*c*. The routine 52 then advances to step 62.

In step 62, the processing unit causes the message to be displayed on the display monitor 18 which instructs the customer to (1) select a desired method of payment, and/or (2) identify himself or herself by inserting a shopping card, debit card, credit card, or smart card into the card reader 21 (see FIG. 1), if necessary. The routine 52 then advances to step 64.

In step 64, the processing unit 12 monitors the communication line 49 from the data input device 20 and the communication line 44 from the display monitor 18 in order to determine if the customer is in need of assistance. In particular, as alluded to above, a message is displayed on the display monitor 18 instructing the customer to touch a particular touch screen area associated with the display monitor 18, or to touch a particular key associated with the data input device 20, if the customer is in need of assistance. If a particular signal is detected on either of the communication lines 44 or 49, the processing unit 12 determines that the customer has requested assistance by a customer service manager, and the routine 52 advances to the step 66. If a particular signal is not detected on either of the communication lines 44 or 49, the processing unit determines that the customer is not in need of assistance, and the routine 52 then ends thereby advancing the routine 50 to the initialization step 54 (see FIG, 4).

In step 66, the processing unit 12 communicates with the status light device 24 in order to request assistance for the customer. In particular, the processing unit 12 generates an output signal which is sent to the status light device 24 which causes the status light device 24 to actuate the red indicator lamp 24*a* in order to display a solid red light therewith. The routine 52 then advances to step 68.

In step 68, the processing unit 12 monitors the data communication lines 44 and 49 to determine if the customer service manager has entered an authorization code via either the touch screen associated with the display monitor 18 or the data input device 20, respectively. In particular, the display monitor 18 or the data input device 20 generates an output signal which is sent to the processing unit 12 once the display monitor 18 or the data input device 20, respectively, has detected the authorization code being entered by the customer service manager. It should be appreciated that entry of the authorization code by the customer service manager is indicative of a response to the customer's request for assistance. More specifically, once the customer service manager has attended to the customer's request for assistance, the customer service manager enters the authorization code thereby facilitating further operation of the self-service checkout terminal 10. It should also be appreciated that the processing unit 12 may communicate with the status light device 24 in order to flash the red indicator lamp 24*a* if the customer service manager does not enter an authorization code within a predetermined period of time thereby drawing further attention to the customer's request for assistance. Hence, in step 68, if the customer service manager enters the authorization code, the routine 52 advances to step 69. If the customer service manager does not enter the authorization code, the routine 52 loops back to step 68 in order to monitor entry of the authorization code.

In step 69, the processing unit 12 resets the status light device 24 to its previous state. In particular, the processing unit 12 generates an output signal which is sent to the status light device 24 thereby deactuating the red indicator lamp 24*a*. The routine 52 then ends thereby advancing the routine 50 to the initialization step 54 (see FIG. 4).

Figure 6:
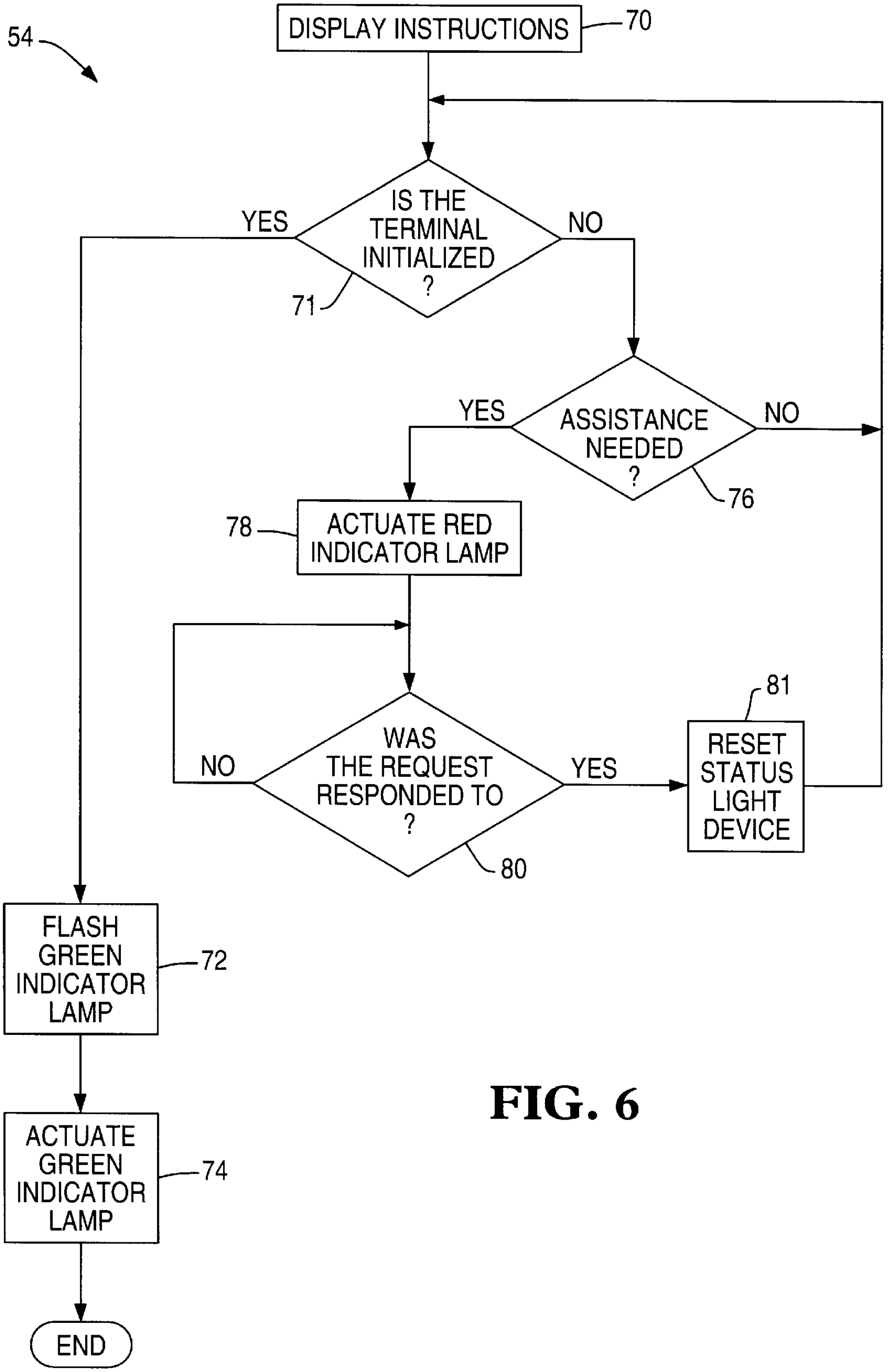
FIG. 6 is a flowchart setting forth in detail the initialization step of the general procedure of FIG. 4.

Referring now to FIG. 6, there is shown a flowchart which sets forth the initialization step 54 of the general procedure 50 in greater detail. The routine 54 begins with step 70 in which one or more initialization instructions are displayed on the display monitor 18 which instruct the customer to (1) select a desired method of payment, and/or (2) identify himself or herself by inserting a shopping card, debit card, credit card, or smart card into the card reader 21 (see FIG. 1). The routine 54 then advances to step 71.

In step 71, the processing unit 12 determines if the customer has initialized the self-service checkout terminal 10. In particular, the processing unit 12 monitors the data communication lines 49 and 44 to determine the customer has selected the desired method of payment by touching a particular key associated with the data input device 20 or by touching a particular touch screen area displayed on the display monitor 18, respectively. Furthermore, in step 71 the processing unit 12 monitors the data communication line 47 to determine if the customer has identified himself or herself by inserting a shopping card, debit card, credit card, or smart card into the card reader 21. It should be appreciated that the self-service checkout terminal 10 may be configured such that the routine 54 allows experienced users of the self-service checkout terminal 10 to initialize the terminal 10 by scanning or otherwise entering his or her first item for purchase thereby postponing selection of a payment method until the finalization step 58 (as discussed further below). Hence, if the customer has initialized the self-service checkout terminal 10 by completing any one of the actions described above, the routine 54 advances to step 72. If the customer has not initialized the self-service checkout terminal 10, the routine 54 advances to step 76.

In step 72, the processing unit 12 generates an output signal which is sent to the status light device 24 which causes the status light device 24 to flash the green indicator lamp 24*c* for a brief period of time such as 2–3 seconds. The flashing green light alerts any customer service manager within visual range of the status light device 24 that the previously idle self-service checkout terminal 10 has been initialized by a customer. Moreover, the flashing green light draws the customer's attention to the video camera 16*a* thereby giving the customer notice that his or her actions are being monitored by the video system 16. The flashing green light may also psychologically reinforce the customer's perception that the self-service checkout terminal 10 is being used properly. The routine 54 then advances to step 74.

In step 74, the processing unit 12 generates an output signal which is sent to the status light device 24 which causes the status light device 24 to actuate the green indicator lamp 24*c* in order to display a solid green light therewith. The solid green light informs any customer service manager within visual range of the status light device 24 that the self-service checkout terminal 10 is being used by the customer. The solid green light also continues to psychologically reinforce to the customer's perception that the self-service checkout terminal 10 is being used properly. The routine 54 then ends thereby advancing the routine 50 to itemization step 56 (see FIG. 4).

Returning now to step 71, if the customer does not initialize the self-service checkout terminal 10, the routine advances to step 76. In step 76, the processing unit 12 monitors the communication line 49 from the data input device 20 and the communication line 44 from the display monitor 18 in order to determine if the customer is in need of assistance. In particular, as alluded to above, a message is displayed on the display monitor 18 instructing the customer to touch a particular touch screen area associated with the display monitor 18, or to touch a particular key associated with the data input device 20, if the customer is in need of assistance. If a particular signal is detected on either of the communication lines 44 or 49, the processing unit 12 determines that the customer has requested assistance by a customer service manager, and the routine 54 advances to the step 78. If a particular signal is not detected on either of the communication lines 44 or 49, the processing unit determines that the customer is not in need of assistance, and the routine 54 loops back to step 71 in order to monitor the initialization of the self-service checkout terminal 10.

In step 78, the processing unit 12 communicates with the status light device 24 in order to request assistance for the customer. In particular, the processing unit 12 generates an output signal which is sent to the status light device 24 which causes the status light device 24 to actuate the red indicator lamp 24*a* in order to display a solid red light therewith. The routine 54 then advances to step 80.

In step 80, the processing unit 12 monitors the data communication lines 44 and 49 to determine if the customer service manager has entered an authorization code via either the touch screen associated with the display monitor 18 or the data input device 20, respectively. In particular, the display monitor 18 or the data input device 20 generates an output signal which is sent to the processing unit 12 once the display monitor 18 or the data input device 20, respectively, has detected the authorization code being entered by the customer service manager. As discussed above, entry of the authorization code by the customer service manager is indicative of a response to the customer's request for assistance. More specifically, once the customer service manager has attended to the customer's request for assistance, the customer service manager enters the authorization code thereby facilitating further operation of the self-service checkout terminal 10. It should also be appreciated that the processing unit 12 may communicate with the status light device 24 in order to flash the red indicator lamp 24*a* if the customer service manager does not enter an authorization code within a predetermined period of time thereby drawing further attention to the customer's request for assistance. Hence, in step 80, if the customer service manager enters the authorization code, the routine 54 advances to step 81. If the customer, service manager does not enter the authorization code, the routine 54 loops back to step 80 in order to monitor entry of the authorization code.

In step 81, the processing unit 12 resets the status light device 24 to its previous state. In particular, the processing unit 12 generates an output signal which is sent to the status light device 24 thereby deactuating the red indicator lamp 24*a*. The routine 54 then loops back to step 71 in order to monitor the initialization of the self-service checkout terminal 10.

Figure 7A:
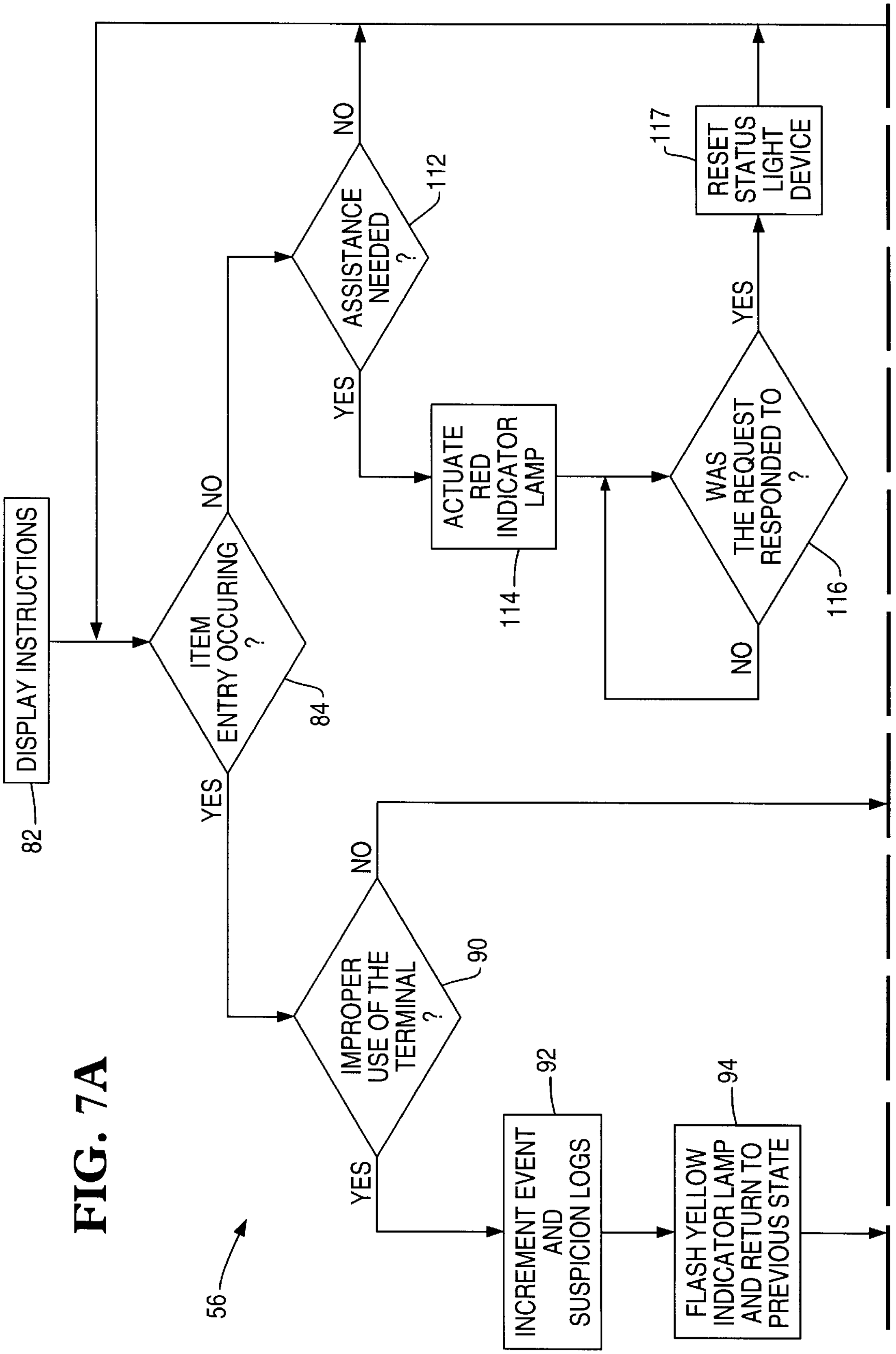
FIG. 7 is a flowchart setting forth in detail the itemization step of the general procedure of FIG. 4.
Figure 7B:
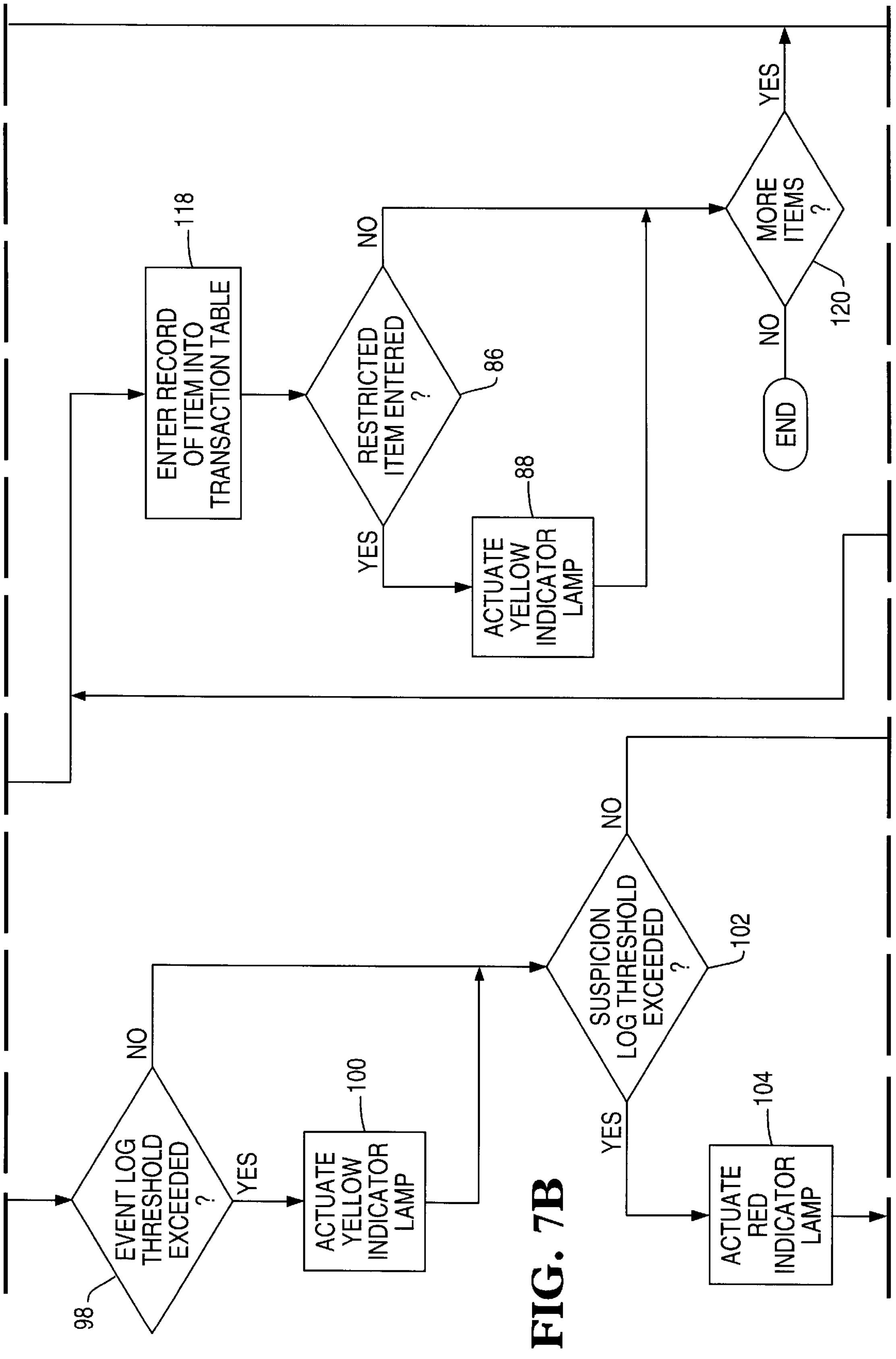
Figures 7, 7C:
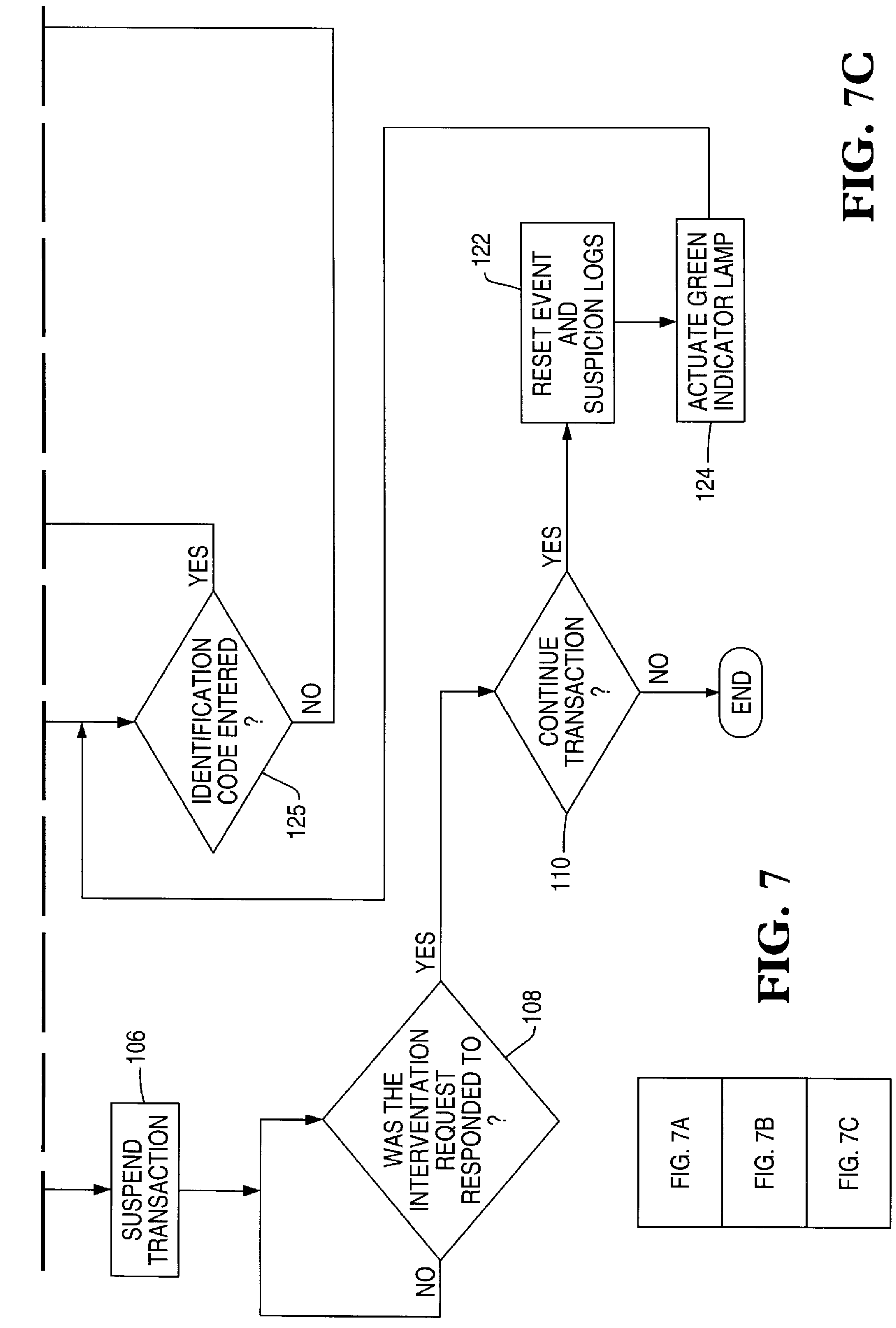

Referring now to FIG. 7, there is shown a flowchart setting forth the itemization step 56 of the routine 50 in greater detail. The routine 56 begins with step 82 in which a message is displayed on the display monitor 18 which instructs the customer to pass or otherwise scan individual items across or adjacent the scanner 14 with the product identification code facing one of the scanning windows 14*a*, 14*b*. Moreover, the message instructs the customer to weigh items such as produce or meat with the product scale 22, and thereafter enter the product identification code associated with the item via either the data input device 20 or by touching a particular touch screen area associated with the display monitor 18. The routine then advances to step 84.

In step 84, the processing unit 12 scans or reads the data communication line 42 to determine whether the video system 16 has detected the customer (1) moving an item across the target area associated with the scanner 14 so as to scan the item with the scanner 14, (2) placing an item on the product scale 22 in order to weigh the item therewith, or (3) manually entering a product code associated with an item via the data input device 20. In particular, the video system 16 generates an output signal which is sent to the processing unit 12 once the video system 16 detects (1) motion of the customer moving the item across the scanner 14, (2) motion of the customer placing the item on the product scale 22, or (3) motion of the customer operating the data input device 20. It should be appreciated that such motions are indicative of an attempt being made by the customer to enter an item into the self-service checkout terminal 10. If item entry is occurring, the routine 56 advances to step 90. If item entry is not occurring, the routine 56 advances to step 112.

In step 90, the processing 12 unit evaluates the current item entry to determine if the self-service checkout terminal 10 is being used in an improper manner. In particular, the processing unit 12 determines if a product identification code associated with the item being entered in step 84 is actually entered into the self-service checkout terminal 10, and if so, the processing unit 12 determines if the item was entered in a proper manner. Hence, in step 90, if the product identification code associated with the item that the customer attempted to enter in step 84 is not actually entered into the self-service checkout terminal 10, the processing unit 12 concludes that an improper-terminal-use activity has occurred. What is meant herein by the term "improper-terminal-use activity" is (1) activity by the customer in which the customer unintentionally operates the self-service checkout terminal 10 improperly, and (2) activity by the customer in which it can be inferred with a high degree of confidence that the customer intentionally operated the self-service checkout terminal 10 improperly for illicit purposes such as theft. For example, if the customer attempted to scan the item with the scanner 14, but the product identification code associated with the item was not read by the scanner 14, the processing unit 12 concludes that the self-service checkout terminal 10 was operated improperly. Moreover, it should be appreciated that even if the product identification code associated with the item is entered, the processing unit 12 may determine that an improper-terminal-use activity has occurred. For example, if the customer scanned a first item, but then placed a second item of greater value into the grocery bag 17, the processing unit 12 concludes that an improper-terminal-use activity has occurred. For further example, if the customer attempts to weigh an item such as produce with the product scale 22, but does not properly position the item on the product scale 22, the processing unit 12 concludes that an improper-terminal-use activity has occurred. Yet further examples of improper-terminal-use activities may include (1) failure to surrender an item after the item has been voided, (2) weighing only a portion of an item (i.e. weighing only one banana, but placing four bananas into the bag 17), and (3) placing an item into the bag 17 without first attempting to scan or otherwise enter the item.

It should be appreciated that although numerous examples of improper-terminal-use activities have herein been described, numerous other types of improper-terminal-use activities may exist and occurrences thereof would be detected in step 90. Further examples of improper-terminal-use activities, along with a number of mechanisms and methods for detecting occurrence thereof, are disclosed in copending U.S. patent applications Ser. No. 08/895,084 entitled "Method and Apparatus for Verifying Identity of an Item Being Checked Out Through a Retail Checkout Terminal" which was filed on Jul. 16, 1997, by Joanne Walter; Ser. No. 08/735,424 entitled "Method and Apparatus for Providing Security for a Self-Service Checkout Station" which was filed on Oct. 22, 1996, by Joanne Walter and Tracy Flynn; Ser. No. 08/910,702 entitled "Method and Apparatus for Resetting a Product Scale of a Retail Checkout Terminal" which was filed on Aug. 13, 1997, by Dusty Lutz; Ser. No. 08/939,868 entitled "Method and Apparatus for Providing Security to a Self-Service Checkout Terminal" which was filed on Sep. 29, 1997, by John Addy and Jim Morrison; Ser. No. 08/991,060 entitled "Method and Apparatus for Reducing Shrinkage During Operation of a Self-Service Checkout Terminal" which was filed on Dec. 15, 1997, by Jim Morrison and Joanne Walter; Ser. No. 08/990,241 entitled "Method and Apparatus for Detecting Item Placement and Item Removal During Operation of a Self-Service Checkout Terminal" which was filed on Dec. 15, 1997, by Jim Morrison and Dusty Lutz; and Ser. No. 08/990,240 entitled "Method and Apparatus for Detecting Item Substitutions During Entry of an Item into a Self-Service Checkout Terminal" which was filed on Dec. 15, 1997, by Dusty Lutz; along with copending U.S. Provisional Applications Ser. No. 60/037,726 entitled "Method for Enhancing Security and Providing Assistance in the Operation of a Self-Service Checkout Terminal" which was filed on Feb. 7, 1997, by Ali Vassigh and Joanne Walter; Ser. No. 60/037,725 entitled "Self-Service Checkout Terminal" which was filed on Feb. 7, 1997, by Stephen Swaine, Ali Vassigh, and Grant Paton; Ser. No. 60/037,728 entitled "Method of Enhancing Security in a Self-Service Checkout Terminal" which was filed on Feb. 7, 1997, by John Addy and Marc Lynn. The disclosure of each of the above-identified patent applications and provisional applications is hereby incorporated by reference, and is assigned to the same assignee as the present invention.

Hence, in step 90, if the processing unit 12 concludes that an improper-terminal-use activity has occurred, an improper-use control signal is generated and the routine 56 advances to step 92. If the processing unit 12 concludes that an improper-terminal-use activity did not occur, the routine 56 advances to step 118.

In step 92, the processing unit 12 increments the event log and the suspicion log by a predetermined value depending on the type of improper-terminal-use activity that was detected in step 90. In particular, as described above, an improper-terminal-use activity includes those occurrences in which the customer unintentionally operated the self-service checkout terminal 10 improperly, along with those occasions in which it can be inferred with a high degree of confidence that the customer intentionally operated the self-service checkout terminal 10 improperly for illicit purposes such as theft. Hence in step 92, the processing unit 12 generates an output signal which is sent to the memory device 30 which causes the event log and/or the suspicion log to be incremented in the memory device 30 by a predetermined value depending on the type of improper-terminal-use activity that was detected in step 90. The routine 56 then advances to step 94.

In step 94, the processing unit 12 generates an output signal which is sent to the status light device 24 which causes the status light device 24 to flash the yellow indicator lamp 24*b* for a brief period of time such as 2–3 seconds. The flashing yellow light alerts any customer service manager within visual range of the status light device 24 that the customer has operated the self-service checkout terminal 10 in an improper manner. Moreover, the flashing yellow light alerts the customer that an improper-terminal-use activity has been detected by the self-service checkout terminal 10 thereby potentially deterring the customer from any further improper-terminal-use activities. After flashing the yellow light for 2–3 seconds, the status light device 24 is reset to its previous setting. For example, if the status light device 24 was previously displaying a solid green light via the green indicator lamp 24*c*, the status light device 24 would be returned to such a state. The routine 56 then advances to step 98.

In step 98, the processing unit 12 compares the event log to its threshold value in order to determine if the event log has a predetermined relationship therewith. In particular, if the value of the event log exceeds its threshold value, an intervention control signal is generated and the routine 56 advances to step 100. If the value of the event log does not exceed its threshold value, the routine 56 advances to step 102.

In step 100, the processing unit 12 generates an output signal which is sent to the status light device 24 which causes the status light device 24 to actuate the yellow indicator lamp 24*b* in order to display a solid yellow light therewith. The solid yellow light notifies the customer service manager that intervention is required before the customer can complete the checkout procedure. In particular, when the event log is exceeded, the customer service manager is required to investigate the customer's transaction so as to determine if the customer was intentionally using the self-service checkout terminal 10 in an improper manner. The routine 56 then advances to step 102.

In step 102, the processing unit 12 compares the suspicion log to its threshold value in order to determine if the suspicion log has a predetermined relationship therewith. In particular, if the value of the suspicion log exceeds its threshold value, an intervention control signal is generated and the routine 56 advances to step 104. If the suspicion log does not exceed its threshold value, the routine 56 advances to step 125.

In step 104, the processing unit 12 generates an output signal which is sent to the status light device 24 which causes the status light device 24 to actuate the red indicator lamp 24*a* in order to display a solid red light therewith. The solid red light alerts the customer service manager that intervention is required before the customer can complete the checkout procedure. In particular, when the suspicion log is exceeded, the customer service manager is required to immediately investigate the customer's transaction so as to determine if the customer was intentionally using the self-service checkout terminal 10 in an improper manner. The routine 56 then advances to step 106.

In step 106, the transaction is suspended. In particular, the customer is prevented from entering any more items into the self-service checkout terminal 10 during the current checkout transaction. More specifically, the self-service checkout terminal 10 will not process any item entries including (1) moving an item across the scanner 14, (2) placing an item on the product scale 22, or (3) operating the data input device 20 until the customer service manager has performed an audit of the customer's checkout transaction. The routine 56 then advances to step 108.

In step 108, the processing unit 12 determines if the customer service manager has entered an authorization code. In particular, the processing unit 12 monitors the data communication lines 49 and 44 to determine the customer service manager has entered the authorization code via the data input device 20 or the touch screen area associated with the display monitor 18, respectively. It should be appreciated that the customer service manager enters an authorization code when the customer service manager commences to audit or otherwise investigate the customer's checkout transaction. It should also be appreciated that the processing unit 12 may communicate with the status light device 24 in order to flash the red indicator lamp 24*a* if the customer service manager does not enter an authorization code within a predetermined period of time thereby drawing further attention to the suspended terminal 10. If the customer service manager enters an authorization code, the routine advances to step 110. If an authorization code is not entered, the routine 56 loops back to step 108 in order to monitor entry of the authorization code.

In step 110, the processing unit determines if the customer's transaction is allowed to continue. In particular, the customer service manager performs an audit or investigation of the customer's transaction in response to the suspension of the transaction in step 106. During such an audit, the customer service manager may compare the items placed in the grocery bags 17 with the items entered into the transaction table in order to determine if items were added to the bags 17 without first having been entered into the terminal 10. After performing an audit, the customer service manager decides whether the customer can continue the transaction. In particular, the customer service manager may determine that the customer was not intentionally using the self-service checkout terminal 10 in an improper manner thereby permitting the transaction to continue. For example, the customer service manager may determine that one or more of the components associated with the self-service checkout terminal 10 is malfunctioning thereby causing improper use of the terminal 10. A further example includes a situation in which the customer inadvertently failed to follow the instructions displayed on the display monitor 18 and therefore requires assistance from the customer service manager in order to properly operate the self-service checkout terminal 10. If the customer service manager determines that the customer's transaction should be permitted to continue, the customer service manager enters an authorization code via the data input device 20 or the touch screen area associated with the display monitor 18 thereby advancing the routine 56 to step 122. If the customer service manager determines that the customer was intentionally using the self-service checkout terminal 10 in an improper manner in order to commit an impropriety such as theft, the customer service manager will enter a different authorization code via the data input device 20 or the touch screen area associated with the display monitor 18 thereby causing the processing unit 12 to cancel the customer's transaction. It should be appreciated that cancellation of the customer's transaction causes the routine 56 to end thereby returning the routine 50 to the idle step 52 (see FIG. 4) in which the self-service checkout terminal 10 will remain in the idle condition until initialized by a subsequent customer.

In step 122, after the customer service manager has audited the customer's transaction and entered the authorization code thereby allowing the transaction to continue, both the event log and suspicion log are reset to their respective original values (e.g. zero). In particular, since the customer service manager has audited the customer's transaction, both the event log and suspicion logs are reset so that the transaction will not be suspended during entry of subsequent items unless further improper-terminal-use activities cause the event log and/or the suspicion log to again exceed their respective thresholds. The routine 56 then advances to step 124.

In step 124, the processing unit 12 generates an output signal which is sent to the status light device 24 which causes the status light device 24 to actuate the green indicator lamp 24*c* in order to display a solid green light therewith. The solid green light indicates that the self-service checkout terminal 10 is once again being operated in a proper manner. The routine 56 then advances to step 125.

In step 125, the processing unit 12 determines if a product identification code associated with an item was entered in step 84. In particular, as alluded to above, even though the processing unit 12 determined in step 90 that the self-service checkout terminal 10 was operated improperly by the customer, a product code associated with an item may have actually been entered in the self-service checkout terminal 10. For example, the customer may have properly scanned an item with the scanner 14, but thereafter either intentionally or unintentionally placed a different item into one of the grocery bags 17. In such a case, the processing unit 12 would determine that an improper-terminal-use activity has occurred even though a product identification code associated with the item has been entered. Hence, in step 125, the processing unit 12 determines if a product identification code associated with an item has been entered in order to enter a record associated with the item into transaction table, if necessary. If the product identification code associated with the item was entered, the routine 56 advances to step 118. If the product identification code associated with the item was not entered, the routine 56 loops back to step 84 in order to monitor a subsequent entry attempt of the item.

In step 118, the processing unit 22 enters a record corresponding to the item in the transaction table. More specifically, the processing unit 12 communicates with the network 28 to obtain the product information (e.g. description and price) of the item. After which, the processing unit 12 updates the transaction table. More specifically, the processing unit 12 generates an output signal which is sent to the memory device 30 which causes the transaction table to be updated in the memory device 30 to include the product information associated with the item. The routine 56 then advances to step 86.

In step 86, the processing unit 12 determines if the item that was entered is a restricted item. In particular, the processing unit 12 communicates with the memory device 30 in order to determine if the item entered into the transaction table in step 118 is one of a number of restricted items. Such restricted items can only be purchased if the customer meets a certain criteria, usually age, required by statute or the like. To verify that the customer meets the certain criteria, intervention by the customer service manager is required. Examples of restricted items include alcoholic beverages and tobacco products. If the processing unit determines that the item entered into the transaction table is a restricted item, a restricted-item control signal is generated and the routine 56 advances to step 88. If the processing unit 12 determines that the item entered is not a restricted item, the routine 56 advances to step 120.

In step 88, the processing unit 12 communicates with the status light device 24 in order to notify the customer service manager that a restricted item has been entered into the transaction table thereby requiring intervention by the customer service manager before the customer can complete the transaction. In particular, the processing unit 12 generates an output signal which is sent to the status light device 24 which causes the status display device to actuate the yellow indicator lamp 24*b* in order to display a solid yellow light therewith. The routine 56 then advances to step 120.

In step 120, the processing unit 12 monitors the communication line 49 from the data input device 20, and the communication line 44 from the display monitor 18 in order to determine whether there are more items to be entered. In particular, a message is displayed on the display monitor 18 instructing the customer to touch a particular touch screen area displayed on the display monitor 18, or to touch a particular key associated with the data input device 20, when the customer has completed entering all of the items for purchase.

If a particular signal is detected on either of the communication lines 44 or 49, the processing unit 12 determines that the checkout procedure is complete thereby causing an end-of-itemization control signal to be generated which in turn causes the routine 56 to end thereby advancing the routine 50 to the finalization step 58 (see FIG. 4). If a signal is not detected on either of the communication lines 43 or 49, the processing unit 12 determines that the customer has additional items for purchase, and the routine 56 returns to step 84.

Returning to step 102, if the suspicion log does not exceed its predetermined threshold value, the routine 56 advances to step 125. In step 125, the processing unit 12 determines if a product identification code associated with the item has been previously entered in the manner previously discussed. If a product code associated with an item was entered in step 84, the routine 56 advances to step 118 in which the processing unit 12 enters a record corresponding to the item in the transaction table in the manner previously discussed. If a product code associated with an item was not entered in step 84, the routine 56 loops back to step 84 in order to monitor a subsequent entry attempt of the item.

Returning to step 90, if the processing unit 12 concludes that the self-service checkout terminal 10 is being used properly, the routine 56 advances to step 118. In step 118 the processing unit 12 enters a record corresponding to the item in the transaction table in the manner previously discussed. Thereafter, the routine 56 advances to step 86 in which the processing unit 12 determines if the item that was entered in step 84 was a restricted item in the manner previously discussed.

Returning to step 84, if item entry is not occurring, the routine 56 advances to step 112. In step 112, the processing unit 12 monitors the communication line 49 from the data input device 20 and the communication line 44 from the display monitor 18 in order to determine if the customer is in need of assistance. In particular, as alluded to above, a message is displayed on the display monitor 18 instructing the customer to touch a particular touch screen area associated with the display monitor 18, or to touch a particular key associated with the data input device 20, if the customer is in need of assistance. If a particular signal is detected on either of the communication lines 44 or 49, the processing unit 12 determines that the customer has requested assistance by a customer service manager, and the routine 56 advances to the step 114. If a particular signal is not detected on either of the communication lines 44 or 49, the processing unit determines that the customer is not in need of assistance, and the routine 56 loops back to step 84 in order to monitor entry of subsequent items into the self-service checkout terminal 10.

In step 114, the processing unit 12 communicates with the status light device 24 in order to request assistance for the customer. In particular, the processing unit 12 generates an output signal which is sent to the status light device 24 which causes the status light device 24 to actuate the red indicator lamp 24*a* in order to display a solid red light therewith. The routine 56 then advances to step 116.

In step 116, the processing unit 12 monitors the data communication lines 44 and 49 to determine if the customer service manager has entered an authorization code via either the touch screen associated with the display monitor 18 or the data input device 20, respectively. In particular, the display monitor 18 or the data input device generates an output signal which is sent to the processing unit 12 once the display monitor 18 or the data input device 20, respectively, has detected the authorization code being entered by the customer service manager. As discussed above, entry of the authorization code by the customer service manager is indicative of a response to the customer's request for assistance. More specifically, once the customer service manager has attended to the customer's request for assistance, the customer service manager enters the authorization code thereby facilitating further operation of the self-service checkout terminal 10. It should also be appreciated that the processing unit 12 may communicate with the status light device 24 in order to flash the red indicator lamp 24*a* if the customer service manager does not enter an authorization code within a predetermined period of time thereby drawing further attention to the customer's request for assistance. Hence, in step 116, if the customer service manager enters the authorization code, the routine 56 advances to step 117. If the customer service manager does not enter the authorization code, the routine 56 loops back to step 116 in order to monitor entry of the authorization code.

In step 117, the processing unit 12 resets the status light device 24 to its previous state. In particular, if the status display device had previously been displaying a green light, the processing unit 12 would generate an output signal which is sent to the status light device 24 thereby causing the status light device 24 to deactuate of the red indicator lamp 24*a* and reactuate the green indicator lamp 24*c* in order to display a solid green light therewith. Alternatively, if the status display device had previously been displaying a yellow light because a restricted item was entered in step 86 or the event log exceeded its predetermined threshold in step 98, and the customer service manager did not tend to the cause of such a yellow light prior to leaving the area proximate the self-service checkout terminal 10 after assisting the customer, the processing unit 12 would generate an output signal which is sent to the status light device 24 thereby causing the status light device 24 to deactuate of the red indicator lamp 24*a* and reactuate the yellow indicator lamp 24*b* in order to display a solid yellow light therewith. The routine 56 then loops back to step 84 in order to monitor entry of subsequent items into the self-service checkout terminal 10.

Figure 8A:
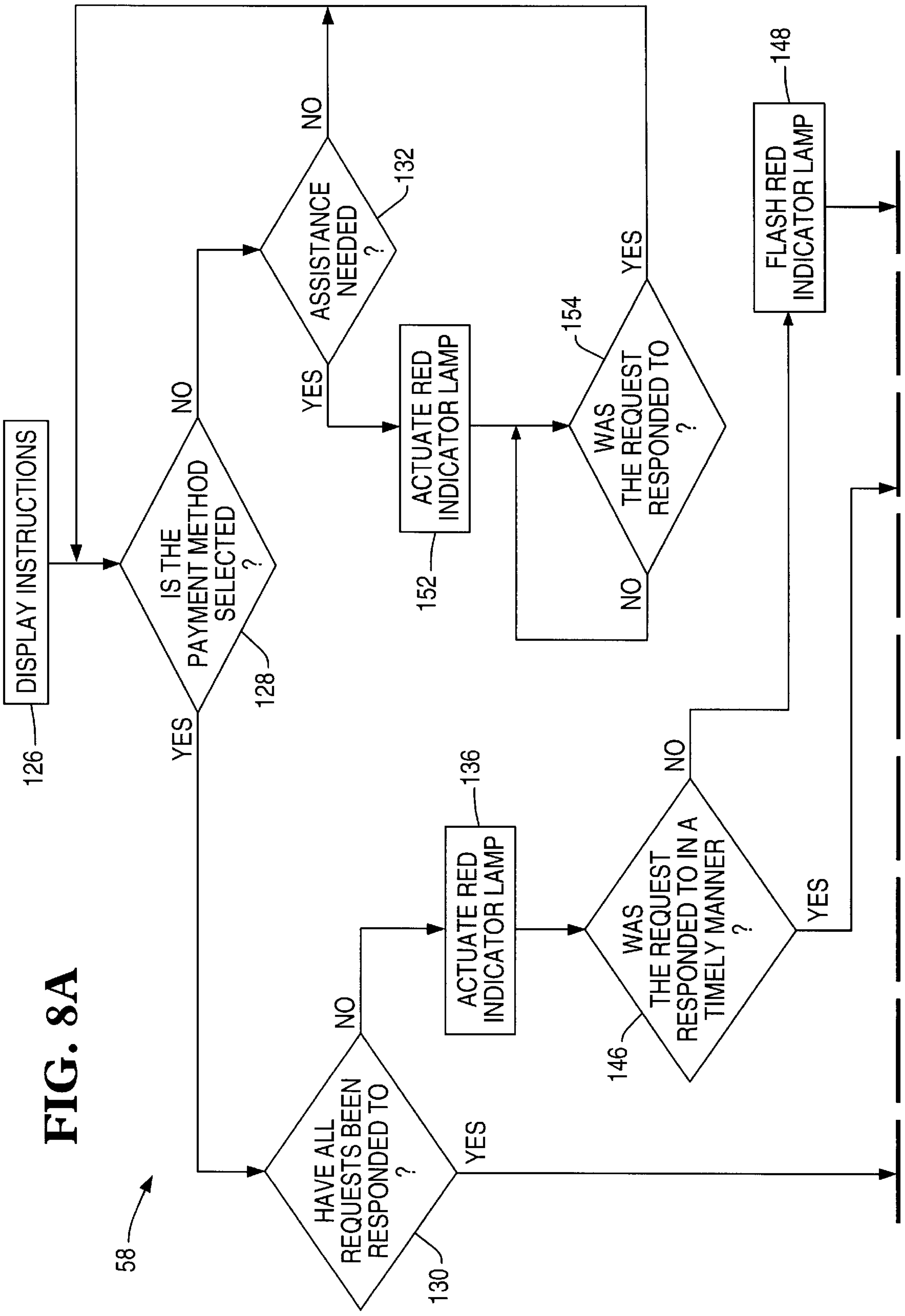
FIG. 8 is a flowchart setting forth in detail the finalization step of the general procedure of FIG. 4.
Figure 8B:
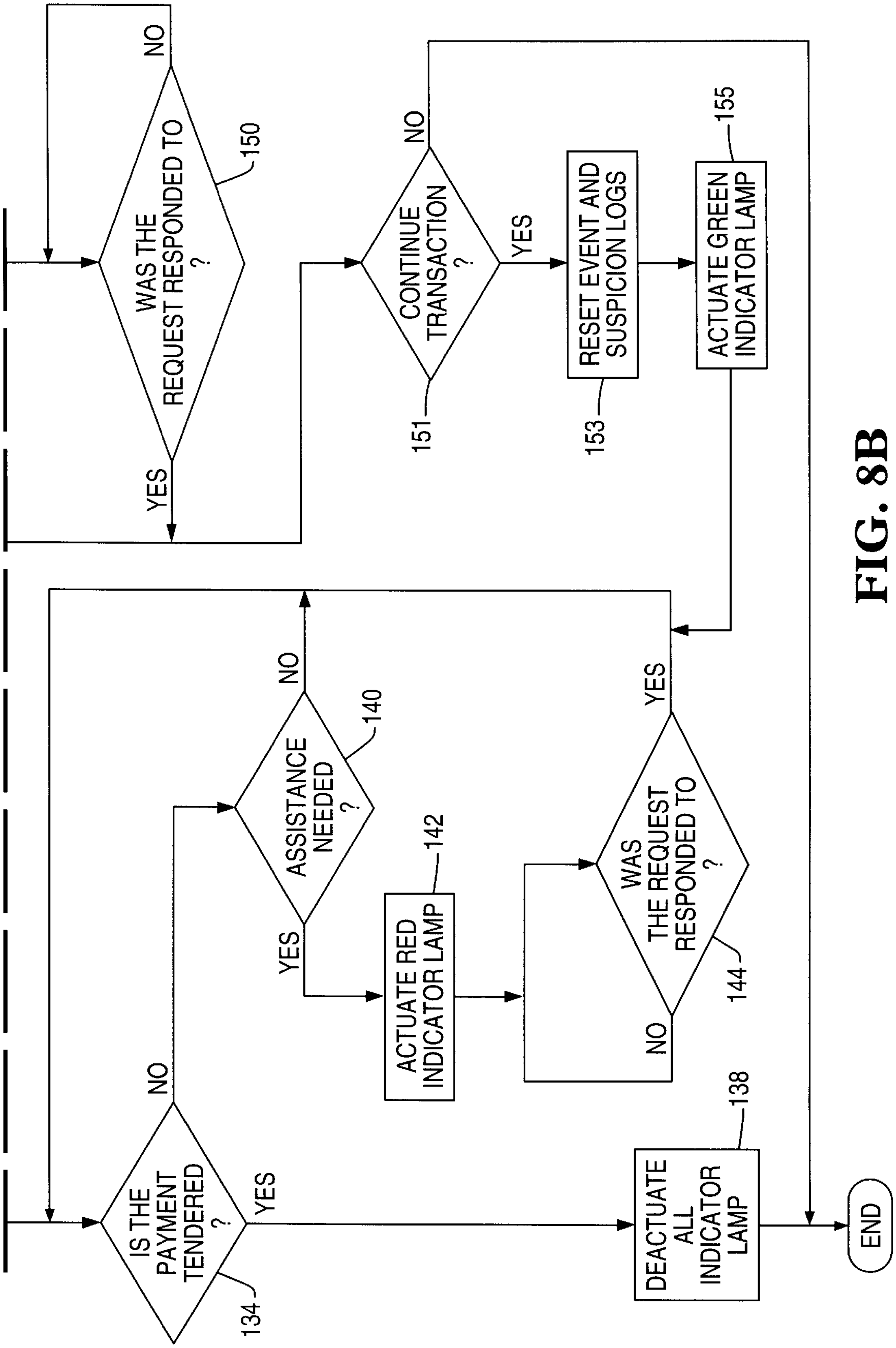

As alluded to above, if subsequent to step 120 the routine 56 ends, the routine 50 (see FIG. 4) is advanced to the finalization step 58. Referring now to FIG. 8, there is shown a flowchart setting forth the finalization step 58 of the routine 50 in greater detail. The routine 58 begins with step 126 in which a message is displayed on the display monitor 18 which instructs the customer to either touch a particular area of the touch screen associated with the display monitor 18, or to touch a particular key associated with the data input device 20 in order to select a method by which the customer intends to pay for his or her items. The routine 58 then advances to step 128.

In step 128, the processing unit determines if the customer has selected a method of payment as instructed in step 126. In particular, the processing unit 12 monitors the data communication lines 44 and 49 to determine if the customer has entered a method of payment via either the touch screen associated with the display monitor 18 or the data input device 20, respectively. In particular, the display monitor 18 or the data input device 20 generates an output signal which is sent to the processing unit 12 once the display monitor 18 or the data input device 20, respectively, has detected a method of payment being entered by the customer. It should be appreciated that the customer may elect to tender payment by either (1) inserting currency into a currency acceptor 23, (2) charging a credit card or debit card account, or (3) decreasing a value amount stored on a smart card via the card reader 21. It should further be appreciated that the customer may have selected a method of payment during initialization of the self-service checkout terminal 10 (i.e. step 71), as discussed above. Hence, if the customer has selected a method of payment (either in step 71 or step 128), the routine advances to step 130. If the customer has not selected a method of payment, the routine 58 then advances to step 132.

In step 130, the processing unit determines if all previous intervention requests have been responded to. In particular, the processing unit 12 determines if any intervention requests have not been responded to by the customer service manager in the manner previously described (i.e. by entering an authorization code via either the touch screen associated with the display monitor 18 or via a key associated with the data input device 20). If all previous intervention requests have been responded to, the routine 58 advances to step 134. If all previous intervention requests have not been responded to, the routine 58 advances to step 136.

In step 134, the processing unit 12 determines if the customer has tendered payment for his or her items for purchase. In particular, the currency acceptor 23 or the card reader 21 generates an output signal when the customer either (1) inserts currency into a currency acceptor 23, or (2) charges a credit card or debit card account or decreases a value amount stored on a smart card via the card reader 21, respectively. If the customer has tendered payment for his or her items for purchase, the routine 58 advances to step 138. If the customer has not tendered payment for his or her purchases, the routine 58 advances to step 140.

In step 138, the processing unit 12 generates an output signal which is sent to the status light device 24 which causes the status light device 24 to deactuate the indicator lamps 24*a*, 24*b*, and 24*c* in order to display no light therewith. The absence of light notifies the customer service manager that the checkout procedure is complete and that the customer will soon be exiting the checkout area. The routine 58 then ends thereby returning the routine 50 (see FIG. 4) to step 52 in which the self-service checkout terminal 10 will remain in the idle condition until initialized by a subsequent customer.

Returning now to step 134, if the customer has not tendered payment for his or her purchases, the routine 58 advances to step 140. In step 140, the processing unit 12 monitors the communication line 49 from the data input device 20 and the communication line 44 from the display monitor 18 in order to determine if the customer is in need of assistance. In particular, as alluded to above, a message is displayed on the display monitor 18 instructing the customer to touch a particular touch screen area associated with the display monitor 18, or to touch a particular key associated with the data input device 20, if the customer is in need of assistance. If a particular signal is detected on either of the communication lines 44 or 49, the processing unit 12 determines that the customer has requested assistance by a customer service manager, and the routine 58 advances to the step 142. If a particular signal is not detected on either of the communication lines 44 or 49, the processing unit determines that the customer is not in need of assistance, and the routine 58 loops back to step 134 to monitor the tendering of payment by the customer.

In step 142, the processing unit 12 communicates with the status light device 24 in order to request assistance for the customer. In particular, the processing unit 12 generates an output signal which is sent to the status light device 24 which causes the status light device 24 to actuate the red indicator lamp 24*a* in order to display a solid red light therewith. The routine 58 then advances to step 144.

In step 144, the processing unit 12 monitors the data communication lines 44 and 49 to determine if the customer service manager has entered an authorization code via either the touch screen associated with the display monitor 18 or the data input device 20, respectively. In particular, the display monitor 18 or the data input device 20 generates an output signal which is sent to the processing unit 12 once the display monitor 18 or the data input device 20, respectively, has detected the authorization code being entered by the customer service manager. It should be appreciated that entry of the authorization code by the customer service manager is indicative of a response to the customer's request for assistance. More specifically, once the customer service manager has attended to the customer's request for assistance, the customer service manager enters the authorization code thereby facilitating further operation of the self-service checkout terminal 10. It should also be appreciated that the processing unit 12 may communicate with the status light device 24 in order to flash the red indicator lamp 24*a* if the customer service manager does not enter an authorization code within a predetermined period of time thereby drawing further attention to the customer's request for assistance. Hence, in step 144, if the customer service manager enters the authorization code, the routine 58 loops back to step 134 to monitor the tendering of payment by the customer. If the customer service manager does not enter the authorization code, the routine 58 loops back to step 144 in order to monitor entry of the authorization code.

Returning now to step 130, if all previous intervention requests have not been responded to, the routine 58 advances to step 136. In step 136, the processing unit 12 communicates with the status light device 24 in order to request intervention by the customer service manager. In particular, the processing unit 12 generates an output signal which is sent to the status light device 24 which causes the status light device 24 to actuate the red indicator lamp 24*a* in order to display a solid red light therewith. It should be appreciated that such intervention (i.e. via the red indicator lamp 24*a*) is requested in order to inform the customer service manager that the customer is nearing the end of his or her transaction and is in need of intervention prior to the completion thereof. The routine 58 then advances to step 146.

In step 146, the processing unit 12 monitors the data communication lines 44 and 49 to determine if the customer service manager has entered an authorization code via either the touch screen associated with the display monitor 18 or the data input device 20, respectively, within a predetermined period of time. In particular, the display monitor 18 or the data input device 20 generates an output signal which is sent to the processing unit 12 once the display monitor 18 or the data input device 20, respectively, has detected the authorization code being entered by the customer service manager. It should be appreciated that entry of the authorization code by the customer service manager is indicative of a response to the customer's request for assistance. More specifically, once the customer service manager has attended to the customers request for assistance, the customer service manager enters the authorization code thereby facilitating further operation of the self-service checkout terminal 10. It should further be appreciated that entry of the authorization code by the customer service manager is desirable in step 146 within a predetermined, short period of time so as to prevent the customer from having to wait for the customer service manager in order to complete his or her transaction. Hence, in step 146, if the customer service manager enters the authorization code within a predetermined period of time, the routine 58 advances to step 151. If the customer service manager does not enter the authorization code within a predetermined period of time, an excessive-time control signal is generated and the routine 58 advances to step 148.

In step 148, the processing unit 12 generates an output signal which is sent to the status light device 24 which causes the status light device 24 to flash the red indicator lamp 24*a*. The flashing red light alerts any customer service manager within visual range of the status light device 24 that the customer is (1) nearing completion, or has already completed, his or her transaction, and (2) that intervention is needed immediately so as to prevent the customer from being delayed in the completion of the transaction. The routine 58 then advances to step 150.

In step 150, the processing unit 12 monitors the data communication lines 44 and 49 to determine if the customer service manager has entered an authorization code via either the touch screen associated with the display monitor 18 or the data input device 20, respectively. In particular, the display monitor 18 or the data input device 20 generates an output signal which is sent to the processing unit 12 once the display monitor 18 or the data input device 20, respectively, has detected the authorization code being entered by the customer service manager. It should be appreciated that entry of the authorization code by the customer service manager is indicative of a response to the customer's request for assistance. More specifically, once the customer service manager has attended to the customers request for assistance, the customer service manager enters the authorization code thereby facilitating further operation of the self-service checkout terminal 10. Hence, in step 150, if the customer service manager enters the authorization code, the routine 58 advances to step 151. If the customer service manager does not enter the authorization code, the routine 58 loops back to step 150 in order to monitor entry of the authorization code.

In step 151, the processing unit determines if the customer's transaction is allowed to continue. In particular, the customer service manager either approves the sale of a restricted item (e.g. verifies the age of the customer) or performs an audit or investigation of the customer's transaction (if the intervention request was the result of the event log exceeding its predetermined threshold) in response to the presence of an intervention request which has not been responded to in step 130. After approving the sale of the restricted item or performing an audit, the customer service manager decides whether the customer can continue the transaction. In particular, in the case of an audit, the customer service manager may determine that the customer was not intentionally using the self-service checkout terminal 10 in an improper manner thereby permitting the transaction to continue. For example, the customer service manager may determine that one or more of the components associated with the self-service checkout terminal 10 is malfunctioning thereby causing improper use of the terminal 10. A further example includes a situation in which the customer inadvertently failed to follow the instructions displayed on the display monitor 18 and therefore requires assistance from the customer service manager in order to properly operate the self-service checkout terminal 10. If the customer service manager determines that the customer's transaction should be permitted to continue, the customer service manager enters an authorization code via the data input device 20 or the touch screen area associated with the display monitor 18 thereby advancing the routine 58 to step 153. If the customer service manager determines that the customer was intentionally using the self-service checkout terminal 10 in an improper manner in order to commit an impropriety such as theft, the customer service manager will enter a different authorization code via the data input device or the touch screen area associated with the display monitor 18 thereby causing the processing unit 12 to cancel the customer's transaction. It should be appreciated that cancellation of the customer's transaction causes the routine 58 to end thereby returning the routine 50 to the idle step 52 (see FIG. 4) in which the self-service checkout terminal 10 will remain in the idle condition until initialized by a subsequent customer.

In step 153, after the customer service manager has approved the sale of a restricted item or audited the customer's transaction and entered the authorization code thereby allowing the transaction to continue, both the event log and suspicion log are reset to their respective original values (e.g. zero). In particular, since the customer service manager has audited the customer's transaction (in the case of where the event log has been exceeded), both the event log and suspicion logs are reset so that the transaction will not be suspended further (unless the customer commits additional improper-terminal-use activities thereby causing the event log and/or the suspicion log to again exceed their respective thresholds). The routine 58 then advances to step 155.

In step 155, the processing unit 12 generates an output signal which is sent to the status light device 24 which causes the status light device 24 to actuate the green indicator lamp 24*c* in order to display a solid green light therewith. The solid green light indicates that the self-service checkout terminal 10 is once again being operated in a proper manner, and that intervention requests have been responded to by the customer service manager. The routine 58 then advances to step 134 to monitor the tendering of payment by the customer in the manner previously discussed.

Returning now to step 146, if the customer service manager enters the authorization code within a predetermined period of time, the routine 58 advances to step 151 in order to determine if the customer's transaction is allowed to continue in the manner previously discussed.

Returning now to step 128, if the customer does not select a method of payment, the routine 58 then advances to step 132. In step 132, the processing unit 12 monitors the communication line 49 from the data input device 20 and the communication line 44 from the display monitor 18 in order to determine if the customer is in need of assistance. In particular, as alluded to above, a message is displayed on the display monitor 18 instructing the customer to touch a particular touch screen area associated with the display monitor 18, or to touch a particular key associated with the data input device 20, if the customer is in need of assistance. If a particular signal is detected on either of the communication lines 44 or 49, the processing unit 12 determines that the customer has requested assistance by a customer service manager, and the routine 58 advances to the step 152. If a particular signal is not detected on either of the communication lines 44 or 49, the processing unit determines that the customer is not in need of assistance, and the routine 58 loops back to step 128 to monitor selection of a method of payment by the customer.

In step 152, the processing unit 12 communicates with the status light device 24 in order to request assistance for the customer. In particular, the processing unit 12 generates an output signal which is sent to the status light device 24 which causes the status light device 24 to actuate the red indicator lamp 24*a* in order to display a solid red light therewith. The routine 58 then advances to step 154.

In step 154, the processing unit 12 monitors the data communication lines 44 and 49 to determine if the customer service manager has entered an authorization code via either the touch screen associated with the display monitor 18 or the data input device 20, respectively. In particular, the display monitor 18 or the data input device 20 generates an output signal which is sent to the processing unit 12 once the display monitor 18 or the data input device 20, respectively, has detected the authorization code being entered by the customer service manager. It should be appreciated that entry of the authorization code by the customer service manager is indicative of a response to the customer's request for assistance. More specifically, once the customer service manager has attended to the customer's request for assistance, the customer service manager enters the authorization code thereby facilitating further operation of the self-service checkout terminal 10. It should also be appreciated that the processing unit 12 may communicate with the status light device 24 in order to flash the red indicator lamp 24*a* if the customer service manager does not enter an authorization code within a predetermined period of time thereby drawing further attention to the customer's request for assistance. Hence, in step 154, if the customer service manager enters the authorization code, the routine 58 loops back to step 128 to monitor selection of a method of payment by the customer. If the customer service manager does not enter the authorization code, the routine 58 loops back to step 154 in order to monitor entry of the authorization code.

While the invention has been illustrated and described in detail in the drawings and foregoing description, such an illustration and description is to be considered as exemplary and not restrictive in character, it being understood that only the preferred embodiment has been shown and described and that all changes and modifications that come within the spirit of the invention are desired to be protected.

For example, while the status device 24 has herein been described as a status light device, and has significant advantages thereby in the present invention, it should be appreciated that certain of these advantages may be had by utilizing other types of status devices. For example, the status device 24 may include an tone generating device for generating audible signals, or the status device 24 may include a voice generating device for generating voice messages. Moreover, the status device 24 may include a paging system which pages or otherwise summons the customer service manager when intervention is required.

As alluded to above, in addition to, or in lieu of, the video system 16, a number of other components may be included in the self-service checkout terminal 10 to provide security therefor. For example, a number of weight scales could be positioned so as to detect the weight of items positioned on the counter 19 or in the bagwell 15. It should be appreciated that detection of such weights may be used to monitor the movement of items through the self-service checkout terminal 10.

What is claimed is:

1. A method of operating a self-service checkout terminal, with the self-service checkout terminal having (i) a status light device which includes a number of indicator lamps, and (ii) a display monitor which is distinct from the status light device, comprising the steps of:

operating the display monitor to display instructions which serve to guide a customer through a checkout procedure with the self-service checkout terminal;

detecting an improper-terminal-use activity and generating an improper-use control signal in response thereto;

operating the status light device so as to activate at least one of the number of indicator lamps in a first mode of operation in response to generation of the improper-use control signal;

updating an electronic log value in response to generation of the improper-use control signal;

generating a first intervention signal if the log value has a predetermined relationship to a log threshold; and operating the status device in a second mode of operation in response to generation of the first intervention control signal, wherein the first mode of operation is different from the second mode of operation.

2. The method of claim 1, wherein:

the status light device intermittently displays a first colored light on the at least one of the number of indicator lamps when the status light device is operated in the first mode of operation, and the status light device continuously displays the first colored light on the at least one of the number of indicator lamps when the status light device is operated in the second mode of operation.

3. The method of claim 1, further comprising the steps of:

generating an end-of-itemization control signal in response to a user's indication that the user has no further items to enter into the checkout terminal; and operating the status device in a third mode of operation if (1) the end-of-itemization signal has been generated, and (2) the status device was operating in the second mode of operation when the end-of-itemization control signal is generated, wherein the third mode of operation is different from each of the first mode of operation and the second mode of operation.

4. The method of claim 3, further comprising the steps of:

determining if a predetermined period of time has lapsed since generation of the end-of-itemization control signal and generating an excessive-time control signal in response thereto; and operating the status device in a fourth mode of operation in response to the excessive time control signal, wherein the fourth mode of operation is different from each of the first mode of operation, the second mode of operation, and the third mode of operation.

5. A method of operating a self-service checkout terminal, comprising the steps of:

detecting an improper-terminal-use activity and generating an improper-use control signal in response thereto;

operating a status device in a first mode of operation in response to generation of the improper-use control signal;

updating an electronic log value in response to generation of the improper-use control signal;

generating a first intervention signal if the log value has a predetermined relationship to a log threshold;

operating the status device in a second mode of operation in response to generation of the first intervention control signal, wherein the first mode of operation is different from the second mode of operation;

generating an end-of-itemization control signal in response to a user's indication that the user has no further items to enter into the checkout terminal; and operating the status device in a third mode of operation if (1) the end-of-itemization signal has been generated, and (2) the status device was operating in the second mode of operation when the end-of-itemization control signal is generated, wherein the third mode of operation is different from each of the first mode of operation and the second mode of operation, wherein the status device includes a status light device, wherein the status light device displays a first colored light when the status light device is operated in either the first mode of operation or the second mode of operation, wherein the status light device displays a second colored light when the status light device is operated in the third mode of operation, and wherein the first colored light is different from the second colored light.

6. A method of operating a self-service checkout terminal, comprising the steps of:

detecting an improper-terminal-use activity and generating an improper-use control signal in response thereto;

operating a status device in a first mode of operation in response to generation of the improper-use control signal;

updating an electronic log value in response to generation of the improper-use control signal;

generating a first intervention signal if the log value has a predetermined relationship to a log threshold;

operating the status device in a second mode of operation in response to generation of the first intervention control signal, wherein the first mode of operation is different from the second mode of operation;

generating an end-of-itemization control signal in response to a user's indication that the user has no further items to enter into the checkout terminal;

operating the status device in a third mode of operation if (1) the end-of-itemization signal has been generated, and (2) the status device was operating in the second mode of operation when the end-of-itemization control signal is generated, wherein the third mode of operation is different from each of the first mode of operation and the second mode of operation;

determining if a predetermined period of time has lapsed since generation of the end-of-itemization control signal and generating an excessive-time control signal in response thereto; and operating the status device in a fourth mode of operation in response to the excessive time control signal, wherein the fourth mode of operation is different from each of the first mode of operation, the second mode of operation, and the third mode of operation, wherein the status device includes a status light device, wherein the status light device displays a first colored light when the status light device is operated in either the first mode of operation or the second mode of operation, wherein the status light device continuously displays a second colored light when the status light device is operated in the third mode of operation, wherein the status light device intermittently displays the second colored light when the status light device is operated in the fourth mode of operation, and wherein the first colored light is different from the second colored light.

7. A method of operating a self-service checkout terminal, with the self-service checkout terminal having (i) a status light device which includes a number of indicator lamps, and (ii) a display monitor which is distinct from the status light device, comprising the steps of:

operating the display monitor to display instructions which serve to guide a customer through a checkout procedure with the self-service checkout terminal;

detecting an improper-terminal-use activity and generating an improper-use control signal in response thereto;

operating the status light device so as to activate at least one of the number of indicator lamps in a first mode of operation in response to generation of the improper-use control signal;

updating an electronic log value in response to generation of the improper-use control signal;

detecting if a user enters an age restricted item into the checkout terminal and generating an age restricted-item control signal in response thereto; and operating the status device in a second mode of operation in response to generation of the age restricted-item control signal, wherein the age restricted item is regulated by a statute which requires a customer to meet a certain age criteria in order to purchase the age restricted item.

8. The method of claim 7, wherein:

the status device includes a status light device, and the status light device continuously displays a colored light when the status light device is operated in the second mode of operation.

9. The method of claim 7, wherein the age restricted item is a member of the following group: an alcoholic beverage product and a tobacco product.

10. A method of operating a self-service checkout terminal, comprising the steps of:

detecting an improper-terminal-use activity and generating an improper-use control signal in response thereto;

operating a status device in a first mode of operation in response to generation of the improper-use control signal; and updating an electronic log value in response to generation of the improper-use control signal, wherein the detecting step includes the step of detecting the improper-terminal-use activity with a video camera, and wherein the status device is mounted on the video camera, whereby a user's attention is drawn to the video camera when the status device is operated in the first mode of operation.

11. A method of operating a self-service checkout terminal, comprising the steps of:

detecting an improper-terminal-use activity and generating an improper-use control signal in response thereto;

operating a status device in a first mode of operation in response to generation of the improper-use control signal;

updating an electronic log value in response to generation of the improper-use control signal;

generating a first intervention signal if the log value has a predetermined relationship to a log threshold;

operating the status device in a second mode of operation in response to generation of the first intervention control signal, wherein the first mode of operation is different from the second mode of operation;

generating an end-of-itemization control signal in response to a user's indication that the user has no further items to enter into the checkout terminal;

operating the status device in a third mode of operation if (1) the end-of-itemization signal has been generated, and (2) the status device was operating in the second mode of operation when the end-of-itemization control signal is generated, wherein the third mode of operation is different from each of the first mode of operation and the second mode of operation;

detecting if a user enters an age restricted item into the checkout terminal and generating an age restricted-item control signal in response thereto; and operating the status device in the second mode of operation in response to generation of the age restricted-item control signal, wherein the age restricted item is regulated by a statute which requires a customer to meet a certain age criteria in order to purchase the age restricted item.

12. The method of claim 11, wherein:

the status device includes a status light device, and the status light device continuously displays a colored light when the status light device is operated in the second mode of operation.

13. The method of claim 11, wherein the age restricted item is a member of the following group: an alcoholic beverage product and a tobacco product.

14. A method of operating a self-service checkout terminal, comprising the steps of:

detecting an improper-terminal-use activity and generating an improper-use control signal in response thereto;

operating a status device in a first mode of operation in response to generation of the improper-use control signal;

updating an electronic log value in response to generation of the improper-use control signal;

generating a first intervention signal if the log value has a predetermined relationship to a log threshold;

operating the status device in a second mode of operation in response to generation of the first intervention control signal, wherein the first mode of operation is different from the second mode of operation;

generating an end-of-itemization control signal in response to a user's indication that the user has no further items to enter into the checkout terminal;

operating the status device in a third mode of operation if (1) the end-of-itemization signal has been generated, and (2) the status device was operating in the second mode of operation when the end-of-itemization control signal is generated, wherein the third mode of operation is different from each of the first mode of operation and the second mode of operation;

detecting if a user enters a restricted item into the checkout terminal and generating a restricted-item control signal in response thereto; and operating the status device in the second mode of operation in response to generation of the restricted-item control signal, wherein the status device includes a status light device, wherein the status light device continuously displays a colored light when the status light device is operated in the second mode of operation, wherein the detecting step includes the step of detecting the improper-terminal-use activity with a video camera, and wherein the status device is mounted on the video camera, whereby a user's attention is drawn to the video camera when the status device is operated in the first mode of operation.

* * * * *